United States Patent
Wang et al.

(10) Patent No.: US 11,575,926 B2
(45) Date of Patent: Feb. 7, 2023

(54) ENHANCED DECODER SIDE MOTION VECTOR REFINEMENT

(71) Applicant: ALIBABA GROUP HOLDING LIMITED, Grand Cayman (KY)

(72) Inventors: Zhao Wang, Beijing (CN); Jiancong Luo, Skillman, NJ (US); Yan Ye, San Diego, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/204,690

(22) Filed: Mar. 17, 2021

(65) Prior Publication Data
US 2021/0314596 A1   Oct. 7, 2021

Related U.S. Application Data

(60) Provisional application No. 63/001,467, filed on Mar. 29, 2020.

(51) Int. Cl.
| | |
|---|---|
| *H04N 19/513* | (2014.01) |
| *H04N 19/176* | (2014.01) |
| *H04N 19/53* | (2014.01) |
| *H04N 19/119* | (2014.01) |
| *H04N 19/159* | (2014.01) |
| *H04N 19/105* | (2014.01) |

(52) U.S. Cl.
CPC ......... *H04N 19/513* (2014.11); *H04N 19/105* (2014.11); *H04N 19/119* (2014.11); *H04N 19/159* (2014.11); *H04N 19/176* (2014.11); *H04N 19/53* (2014.11)

(58) Field of Classification Search
CPC .. H04N 19/513; H04N 19/105; H04N 19/119; H04N 19/159; H04N 19/176; H04N 19/53; H04N 19/52
See application file for complete search history.

(56) References Cited

U.S. PATENT DOCUMENTS

| | | | |
|---|---|---|---|
| 2019/0110058 A1 | 4/2019 | Chien et al. | |
| 2020/0221117 A1* | 7/2020 | Liu | ....................... H04N 19/137 |
| 2021/0297691 A1* | 9/2021 | Chuang | ................ H04N 19/423 |

FOREIGN PATENT DOCUMENTS

WO   WO 2020/058886 A1   3/2020

OTHER PUBLICATIONS

PCT International Search Report and Written Opinion dated Jun. 3, 2021, issued in corresponding International Application No. PCT/US2021/022805 (7 pgs.).
"Requirements for a Future Video Coding Standard v5," International Organisation for Standardisation, Torino, IT, 14 pages (2017).
Bross et al., "Versatile Video Coding (Draft 5)," JVET-N1001-v8, 14th Meeting: Geneva, CH Mar. 19-27, 2019, 300 pages.

(Continued)

*Primary Examiner* — Nam D Pham
(74) *Attorney, Agent, or Firm* — Finnegan, Henderson, Farabow, Garrett & Dunner, LLP

(57) ABSTRACT

The present disclosure provides systems and methods for processing video content. The method can include: generating, for a coding block, a motion vector (MV) in a first coding mode; and updating the MV by performing a decoder side motion vector refinement (DMVR) process on the coding block.

19 Claims, 23 Drawing Sheets

Exemplary Decoder-side Motion Vector Refinement (DMVR)

(56) References Cited

OTHER PUBLICATIONS

Bross et al., "Versatile Video Coding (Draft 6), "JVET-O2001-vE, 15th Meeting: Gothenburg, SE, Jul. 3-12, 2019, 455 pages.
Bross et al., "Versatile Video Coding (Draft 7), "JVET-P2001-vE, 16th Meeting: Geneva, CH, Oct. 1-11, 2019, 488 pages.
Chen et al., "Algorithm Description of Joint Exploration Test Model 7 (JEM 7)," JVET-G1001-v1, 7th Meeting: Torino, IT, Jul. 13-21, 2017, 50 pages.
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
Sullivan et al., "Overview of the High Efficiency Video Coding (HEVC) Standard," IEE Transactions on Circuits and Systems for Video Technology, vol. 22, No. 12, pp. 1649-1668 (2012).
JEM, https://jvet.hhi.fraunhofer.de/svn/svn_HMJEMSoftware.

\* cited by examiner

Exemplary Decoder-side Motion Vector Refinement (DMVR)

Positions of spatial neighboring Coding Unit (CU)

Merge Mode with Motion Vector Differences (MMVD) search point

Two exemplary control points and three control points based affine motion models Affine Motion Vector (MV) field per subblock Locations of Candidates position for affine merge mode Control point motion vector inheritance Multi-level Decoder-side Motion Vector Refinement (DMVR)

Directional symmetric Motion Vector (MV) offsets in proposed Decoder-side Motion Vector Refinement (DMVR)

Temple based Decoder-side Motion Vector Refinement (DMVR)

Temple based Decoder-side Motion Vector Refinement (DMVR)
for two forward reference frames The Decoder-side Motion Vector Refinement (DMVR) search region in the combination of DMVR and Merge Mode with Motion Vector Differences (MMVD)

Illustration of the neighboring blocks

Illustration of the combination between Decoder-side Motion Vector Refinement (DMVR) and Advanced Motion Vector Prediction (AMVP)

ENHANCED DECODER SIDE MOTION VECTOR REFINEMENT

CROSS-REFERENCE TO RELATED APPLICATIONS

The present disclosure claims priority to U.S. provisional application No. 63/001,467, filed on Mar. 29, 2020, which is incorporated herein by reference in its entirety.

TECHNICAL FIELD

The present disclosure generally relates to video processing, and more particularly, to methods and apparatuses for performing enhanced decoder side motion vector refinement (DMVR).

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (e.g., HEVC/H.265) standard, the Versatile Video Coding (e.g., VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method and apparatus for processing video content. The method can include: performing a decoder side motion vector refinement (DMVR) process on a coding block, to generate a first motion vector; splitting the coding block into a plurality of subblocks; and performing the DMVR process on the plurality of subblocks, to generate an updated motion vector for each of the plurality of subblocks based on the first motion vector.

The apparatus can include a memory storing a set of instructions; and one or more processors configured to execute the set of instructions to cause the apparatus to perform: performing a decoder side motion vector refinement (DMVR) process on a coding block, to generate a first motion vector; splitting the coding block into a plurality of subblocks; and performing the DMVR process on the plurality of subblocks, to generate an updated motion vector for each of the plurality of subblocks based on the first motion vector.

The embodiments of the present disclosure further provide a non-transitory computer readable medium that stores a set of instructions that is executable by at least one processor of a computer to cause the computer to perform a method for processing video content, the method comprising: performing a decoder side motion vector refinement (DMVR) process on a coding block, to generate a first motion vector; splitting the coding block into a plurality of subblocks; and performing the DMVR process on the plurality of subblocks, to generate an updated motion vector for each of the plurality of subblocks based on the first motion vector.

Embodiments of the present disclosure provide a method and apparatus for processing video content. The method can include: generating, for a coding block, a motion vector (MV) in a first coding mode; and updating the MV by performing a decoder side motion vector refinement (DMVR) process on the coding block.

The apparatus can include a memory storing a set of instructions; and one or more processors configured to execute the set of instructions to cause the apparatus to perform: generating, for a coding block, a motion vector (MV) in a first coding mode; and updating the MV by performing a decoder side motion vector refinement (DMVR) process on the coding block.

The embodiments of the present disclosure further provide a non-transitory computer readable medium that stores a set of instructions that is executable by at least one processor of a computer to cause the computer to perform a method for processing video content, the method comprising: generating, for a coding block, a motion vector (MV) in a first coding mode; and updating the MV by performing a decoder side motion vector refinement (DMVR) process on the coding block.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
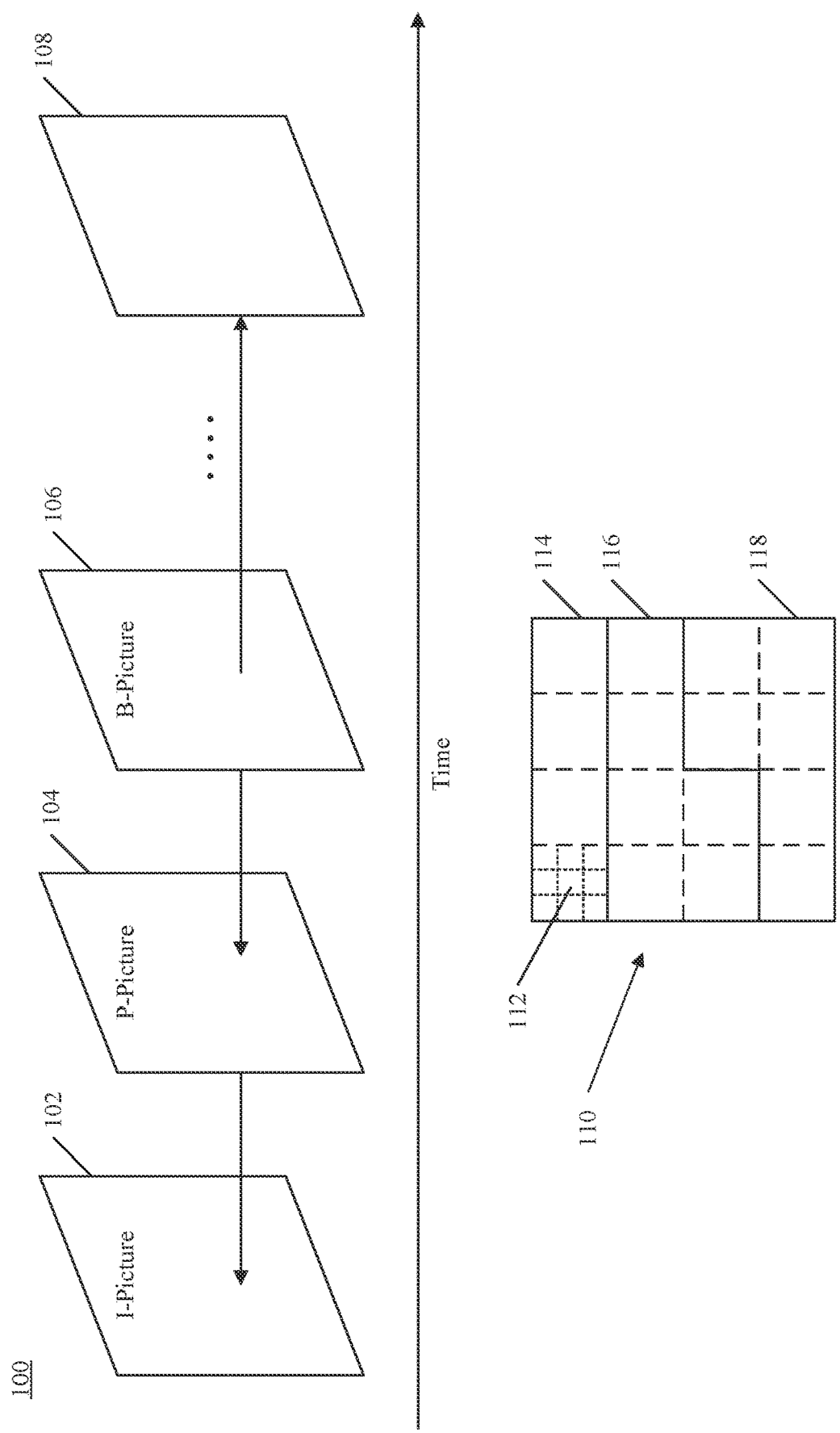
FIG. 1 is a schematic diagram illustrating structures of an example video sequence, consistent with some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

The present disclosure is directed to methods and apparatuses for performing enhanced decoder side motion vector refinement (DMVR) consistent with above-described video coding standards. FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit. A CTU is the largest block unit and can include as many as 128×128 luma samples (plus the corresponding chroma samples depending on the chroma format). A CTU may be further partitioned into coding units (CUs) using quad-tree, binary tree, ternary tree, or a combination thereof.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
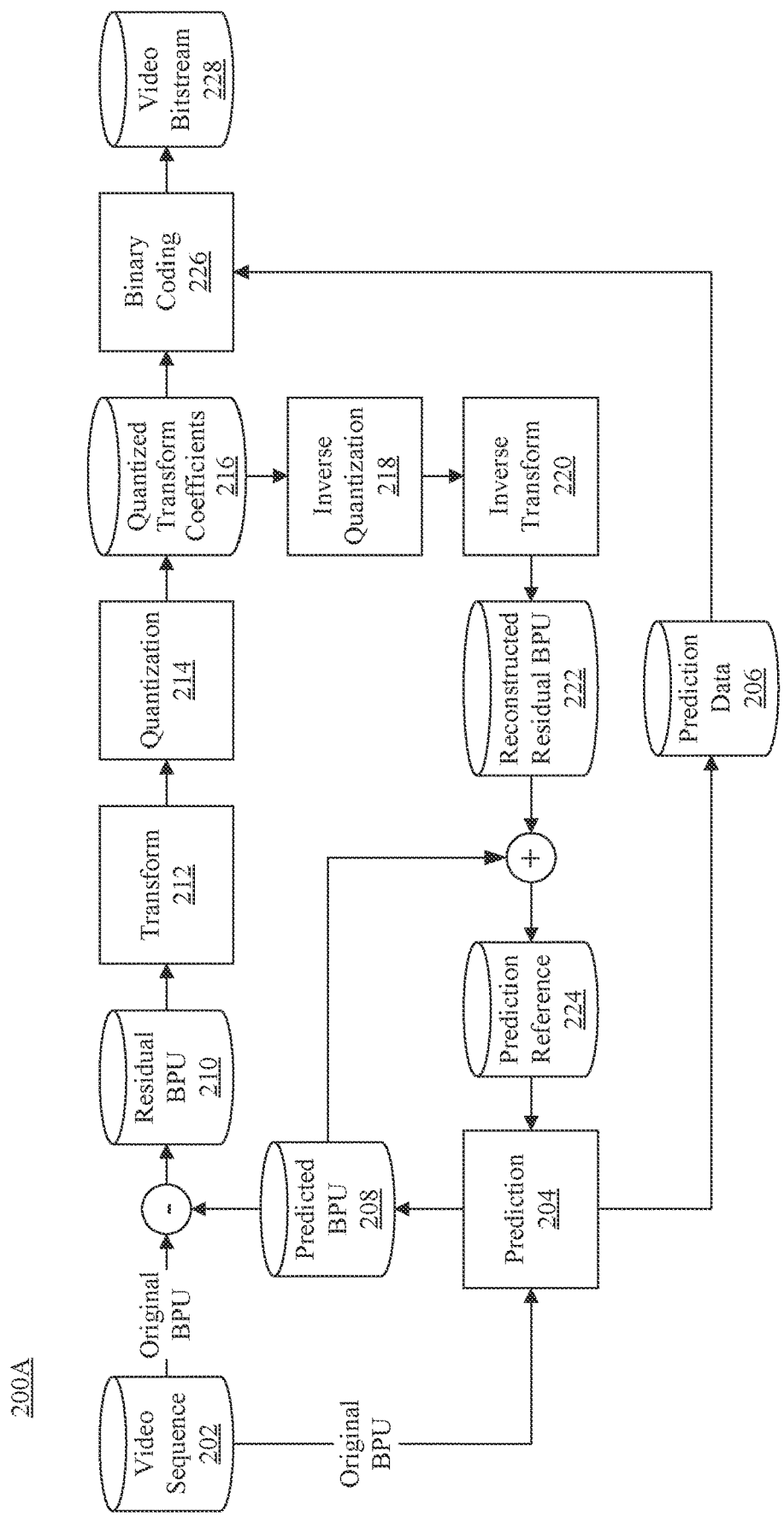
FIG. 2A is a schematic diagram illustrating an exemplary encoding process of a hybrid video coding system, consistent with some embodiments of the present disclosure.
Figure 2B:
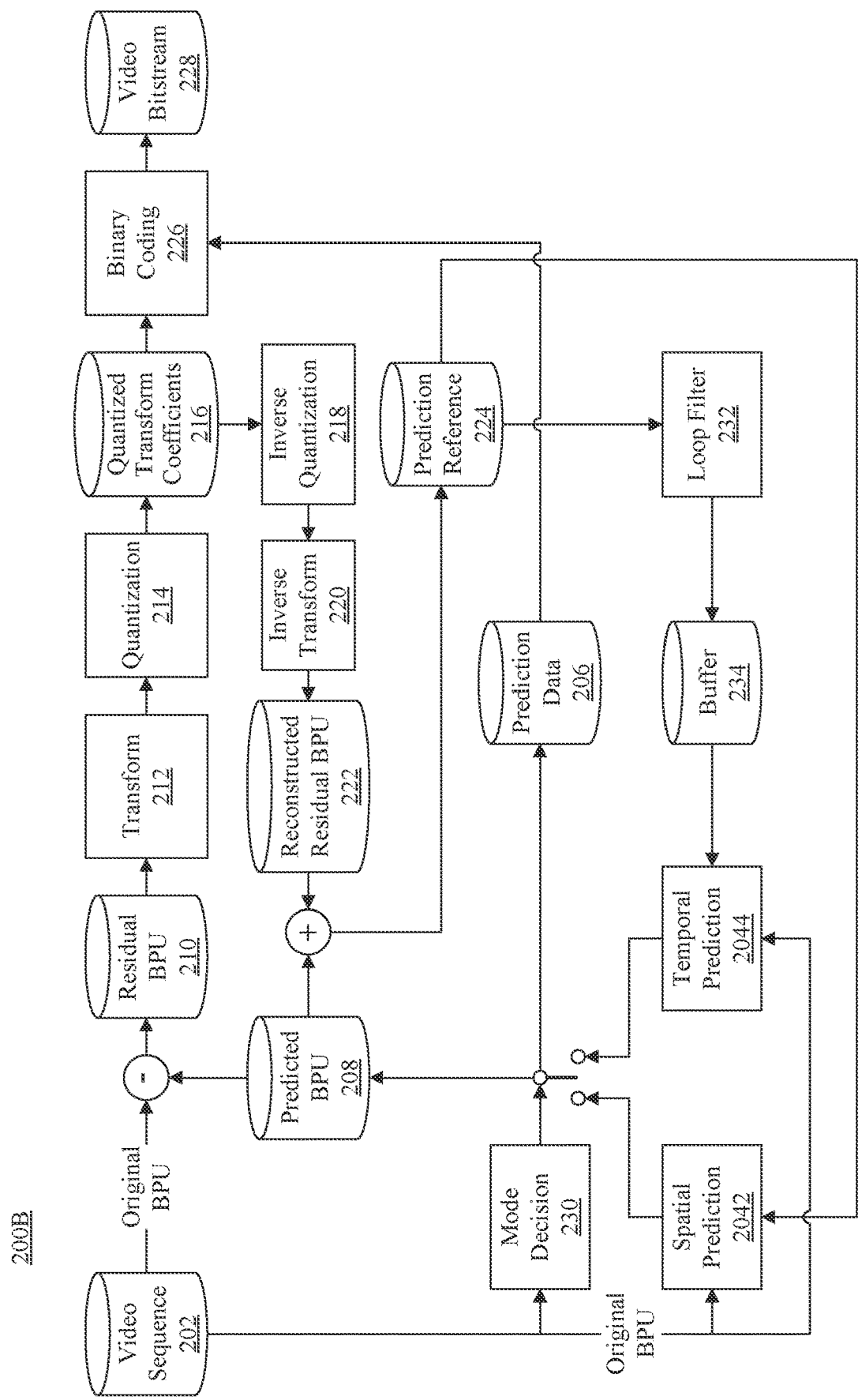
FIG. 2B is a schematic diagram illustrating another exemplary encoding process of a hybrid video coding system, consistent with some embodiments of the present disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3-3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder may record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
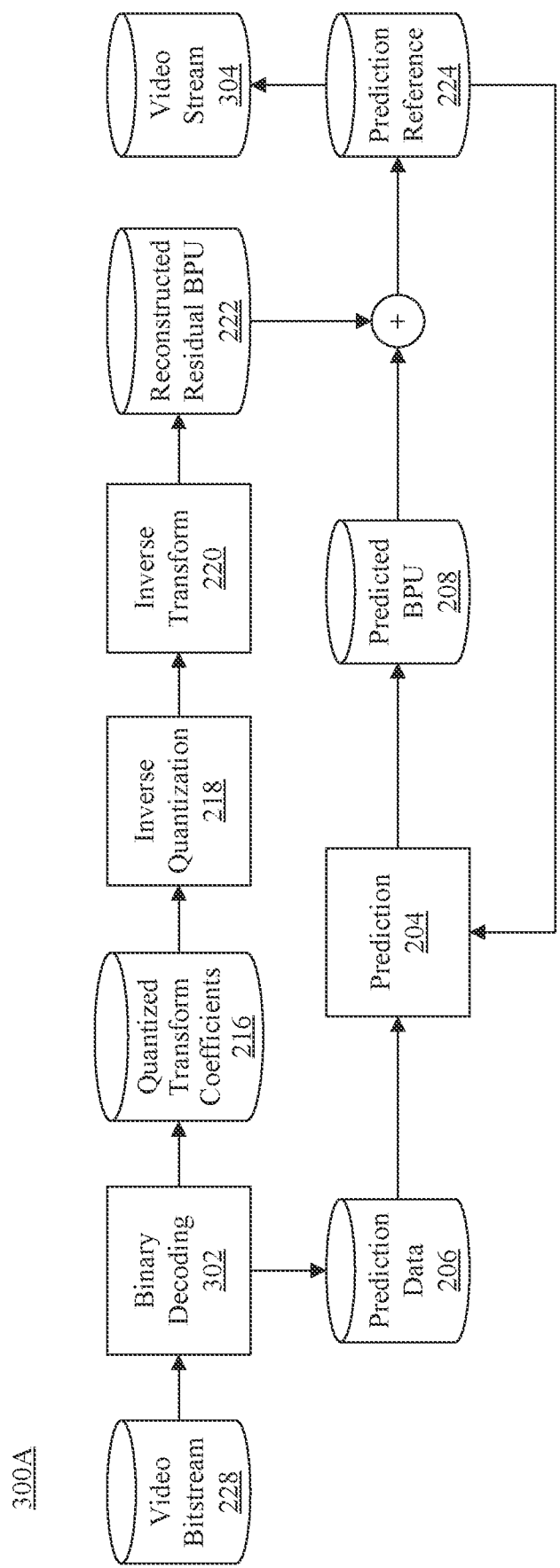
FIG. 3A is a schematic diagram illustrating an exemplary decoding process of a hybrid video coding system, consistent with some embodiments of the present disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
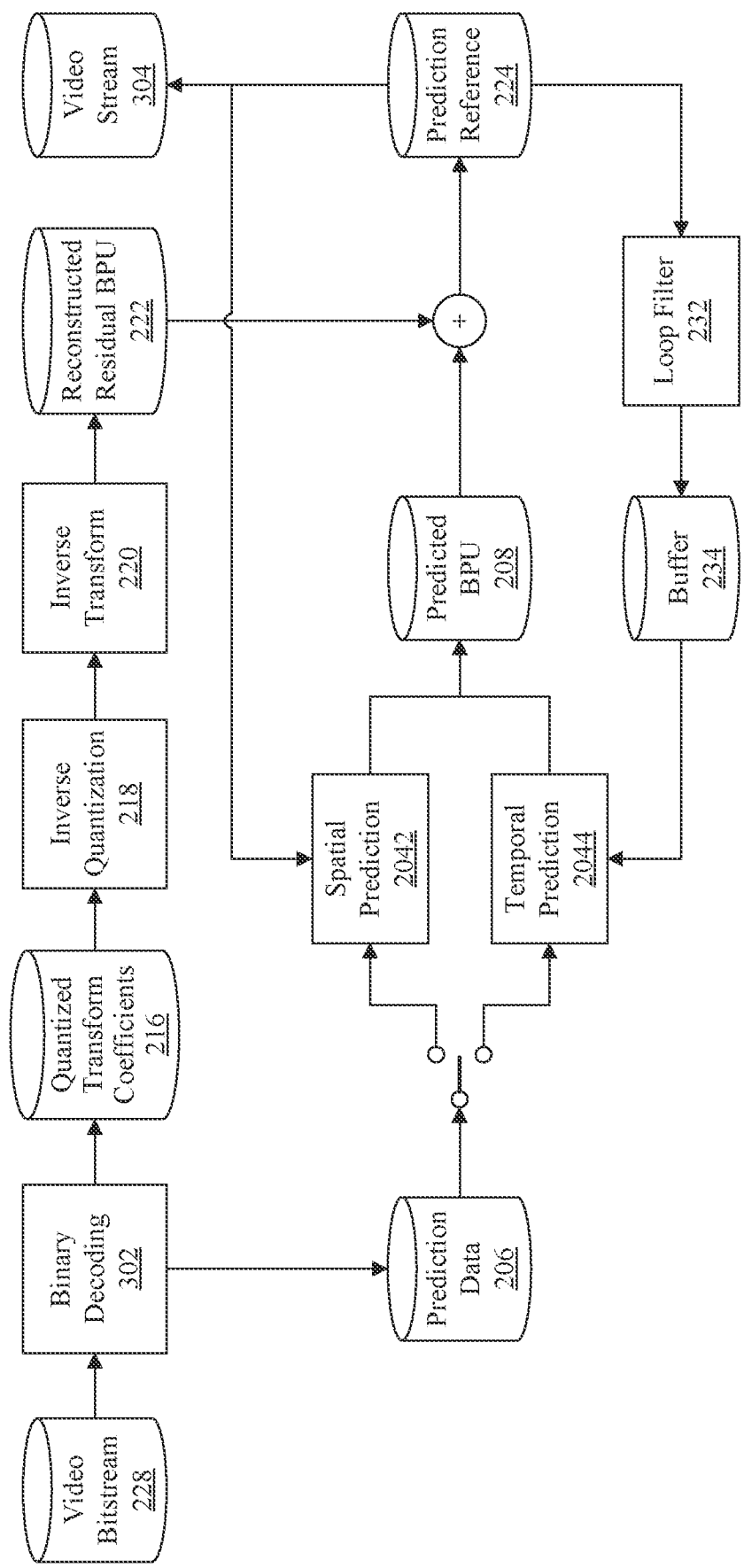
FIG. 3B is a schematic diagram illustrating another exemplary decoding process of a hybrid video coding system, consistent with some embodiments of the present disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
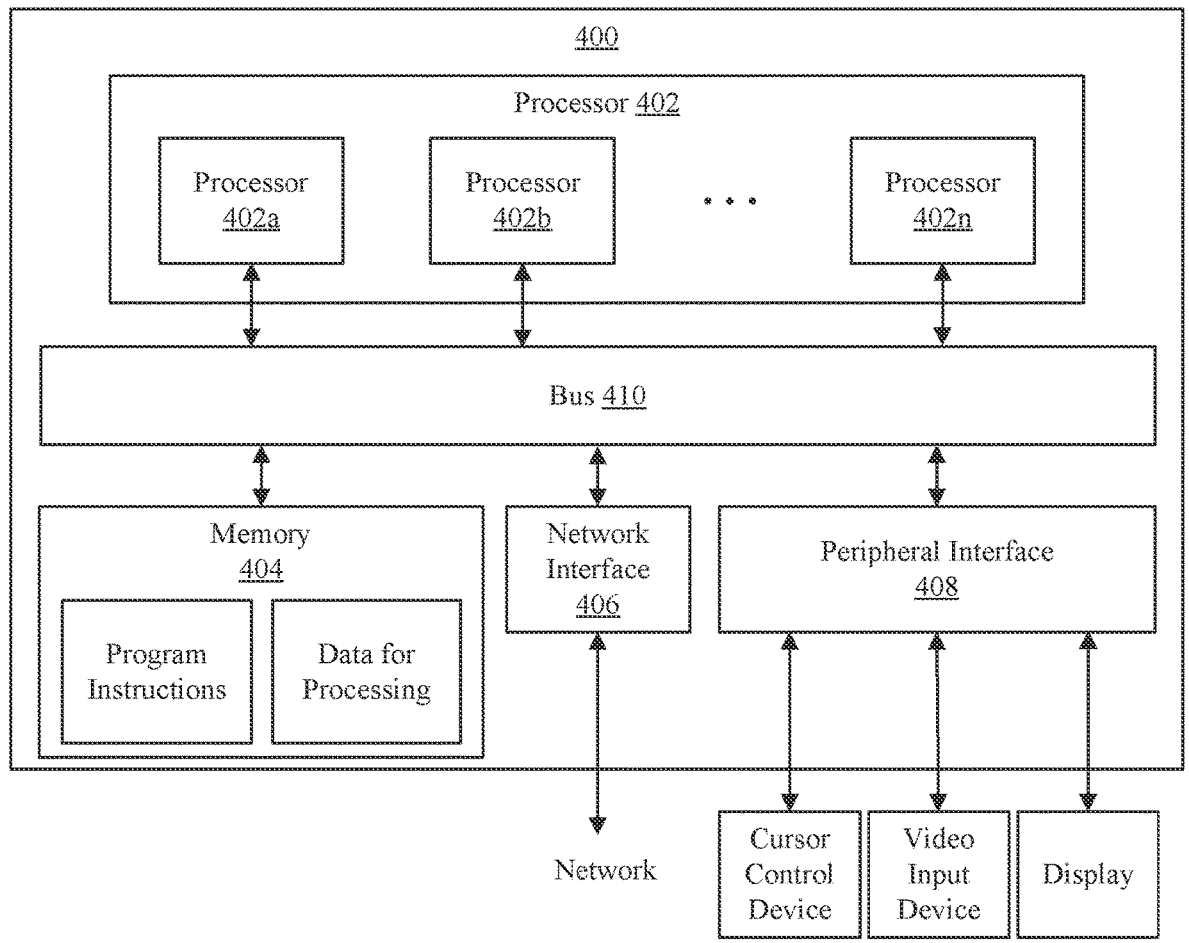
FIG. 4 is a block diagram of an exemplary apparatus for encoding or decoding a video, consistent with some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Figure 5:
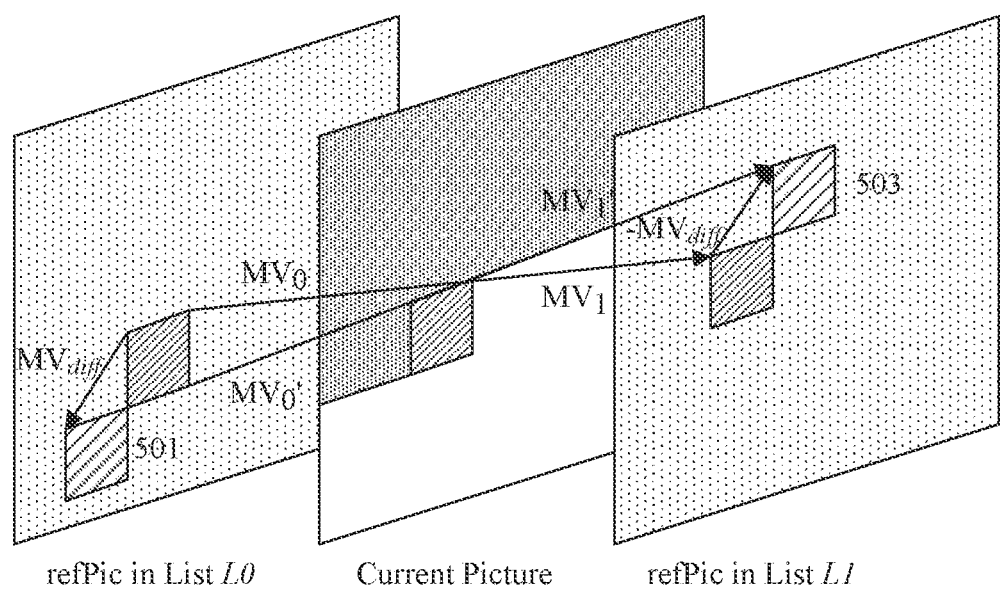
FIG. 5 is a schematic diagram illustrating an exemplary decoder side motion vector refinement (DMVR) process, consistent with some embodiments of the disclosure.

In some embodiments consistent with the present disclosure, to increase the accuracy of motion vectors (MVs) of the merge mode, a bilateral-matching based decoder side motion vector refinement (DMVR) is applied in VVC. In bi-prediction operation, a refined MV is searched around the initial MVs in the reference picture list L0 and reference picture list L1. The bilateral-matching method calculates the distortion between the two candidate blocks in the reference picture list L0 and list L1. As illustrated in FIG. 5, the sum of difference (SAD) between block 501 and block 503 based on each MV candidate around the initial MV is calculated. The MV candidate with the lowest SAD becomes the refined MV and is used to generate the bi-predicted signal.

In DMVR, the MV candidate pairs surround the initial MV and obey the following relationship:

$$MV0'=MVI0+MV\_offset \quad \text{Eq. (1)}$$

$$MV1'=MVI1-MV\_offset \quad \text{Eq. (2)}$$

where MV_offset represents the refinement offset between the initial MV (MVI0, MVI1) and the refined MV (MV0', MV1'). In VVC draft 7, a refinement search range is two integer luma samples from the initial MV. The searching process includes the integer sample offset search stage and fractional sample refinement stage.

In the integer sample offset search stage, 25 points full search is applied. The SAD of the initial MV pair (MVI0, MVI1) is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DM VR refinement, the original MV is favored during the DMVR process. The SAD between the reference blocks referred by the initial MV candidates is decreased by ¼ of the SAD value.

The integer sample search is followed by fractional sample refinement. To save the computational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-dimensional parabolic error surface equation of the following form $$E(x,y)=A(x-x\_min)^2+B(y-y\_min)^2+C \quad \text{Eq. (3)}$$

where (x_min, y_min) corresponds to the fractional position with the least cost and C corresponds to the minimum cost value. By solving the above Equation (3) by using the cost value of the five search points, the (x_min, y_min) is computed as:

$$x\_min=(E(-1,0)-E(1,0))/(2(E(-1,0)+E(1,0)-2E(0,0)))  \quad \text{Eq. (4)}$$

$$y\_min=(E(0,-1)-E(0,1))/(2((E(0,-1)+E(0,1)-2E(0,0)))  \quad \text{Eq. (5)}$$

The values of x_min and y_min are automatically constrained to be between −8 and 8 since all cost values are positive and the smallest value is E(0,0). This corresponds to half pel offset with 1/16-pel MV accuracy in VVC draft 7. The computed fractional (x_min,y_min) are added to the integer distance refinement MV to get the sub-pixel accurate refinement delta MV.

In VVC draft 7, the DMVR may be applied only to CUs coded by normal merge mode and the bi-prediction MVs of the merge candidate has the same delta picture order count (POC). In other words, the two reference pictures are of equal distance to the current picture in the temporal domain.

In current VVC, DMVR may be only applied to CUs coded by normal merge mode. DMVR may be also only applied to the CUs with more than 64 luma samples and either the width or the height is larger than or equal to 8 luma samples. When the CU width and height are both larger than or equal to 16 luma samples, the CU will be further split into 16×16 subblocks and DMVR will be applied on each of the 16×16 subblocks. If the CU width is equal to 8 luma samples, the DMVR process unit size is set to 8×16. Similarly. And if the CU height is equal to 8 luma samples, the DMVR process unit size is set to 16×8.

In some embodiments consistent with the present disclosure, subblock-based temporal motion vector prediction is used. For CUs coded using inter prediction, reference blocks in previously decoded pictures (i.e. reference pictures) are identified as predictors. The relative position between a reference block in the reference picture and the coding block in the current picture is defined as motion vector (MV). The motion information of the current CU is specified by the number of predictors, reference picture index(es) and the corresponding MV(s). After obtaining the prediction by motion compensation based on the motion information, the residual between the prediction signal and the original signal may additionally go through transformation, quantization and entropy coding, before being packed into the output bitstream.

If the motion information is explicitly signaled by the MVs, it is called advanced motion vector prediction (AMVP) mode. If the motion information is derived from the spatial and temporal neighboring blocks, it is termed as merge mode. Besides the normal merge mode, VVC supports the subblock-based temporal motion vector prediction (SbTMVP) method. SbTMVP mode uses the motion field in the collocated picture (selected from one of the reference pictures of the current picture) to improve motion vector prediction of sub-blocks within the current CU. Which of the reference pictures is designated as the collocated picture is signaled in the slice header.

Figure 6:
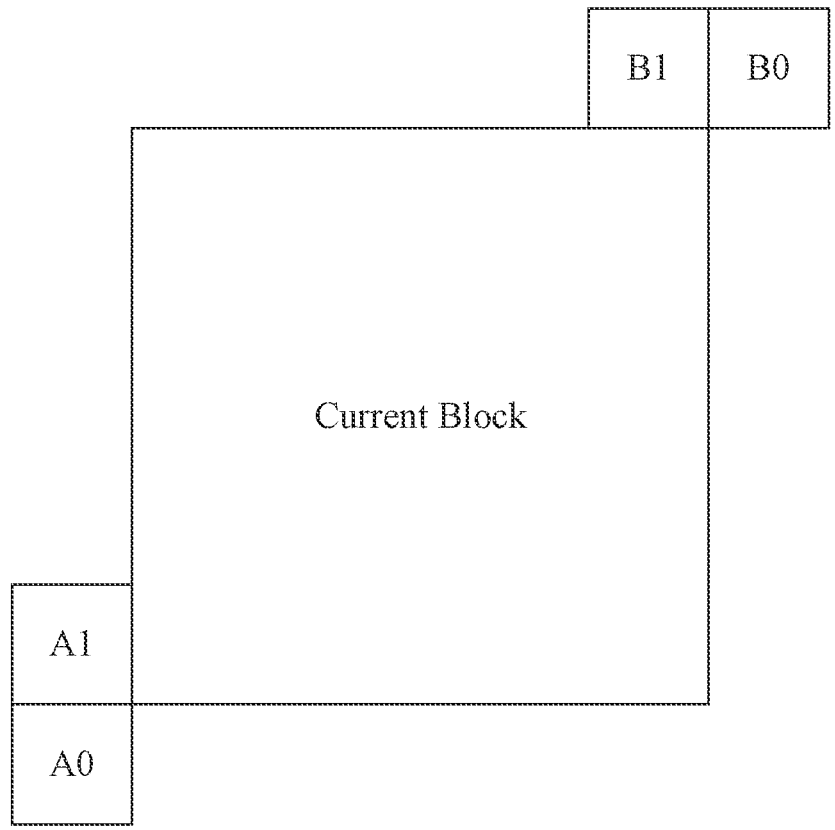
FIG. 6 is a schematic diagram illustrating exemplary spatial neighboring coding units (CUs), consistent with some embodiments of the disclosure.

In the first step, a motion shift is derived to identify the position of collocated block. The spatial neighboring CU A1 is examined, as shown in FIG. 6. If A1 has a motion vector that uses the collocated picture as its reference picture, this motion vector is selected to be the motion shift to be applied. If no such motion is identified, then the motion shift is set to (0, 0).

Figure 7:
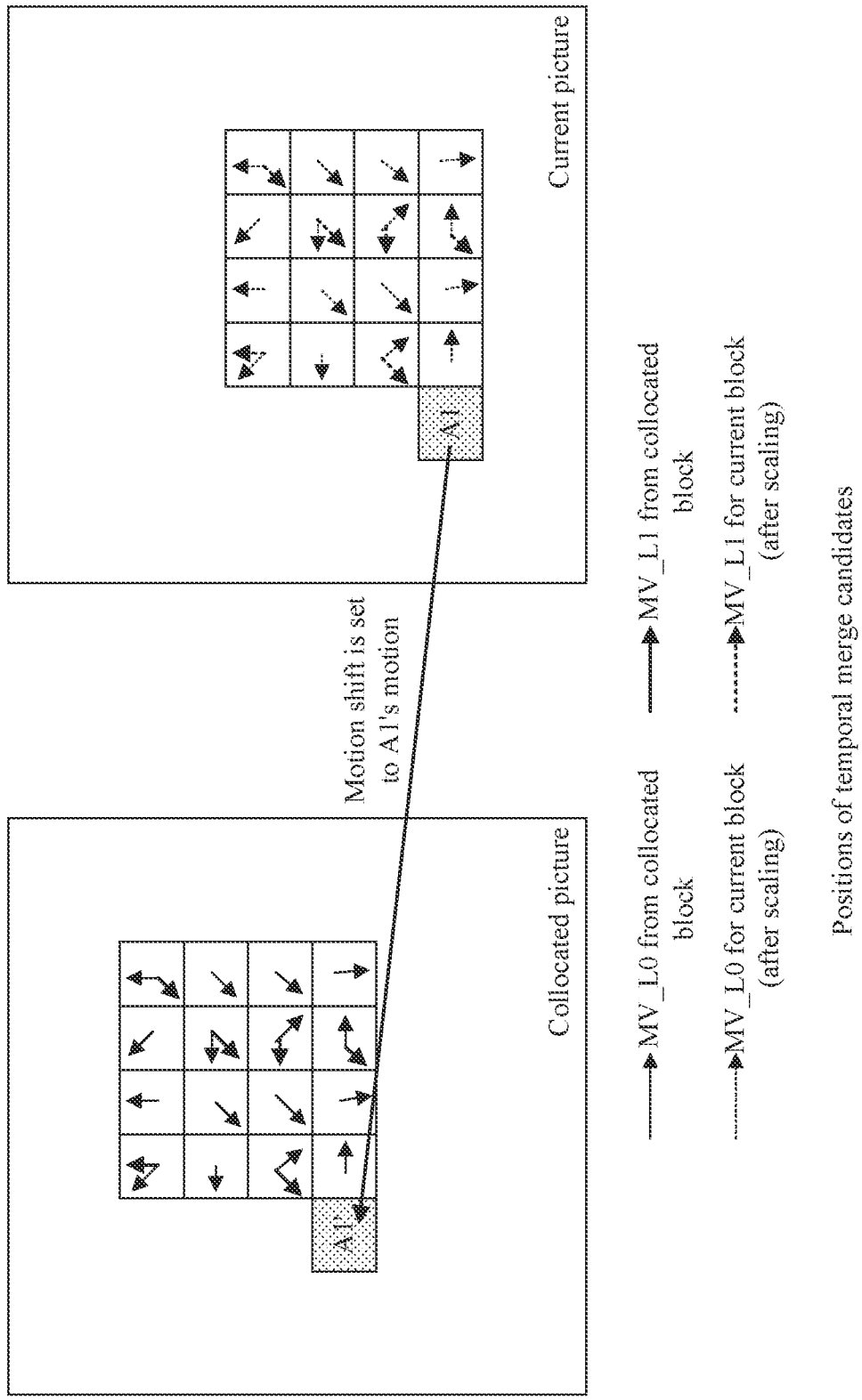
FIG. 7 is a schematic diagram illustrating exemplary positions of temporal merge candidates, consistent with some embodiments of the disclosure.

In the second step, the motion shift added to the current CU's coordinates is applied to obtain the collocated block. Then, for each sub-block, the motion information of its corresponding block (the smallest motion grid that covers the center sample) in the collocated picture is used to derive the motion information for the sub-block in the current CU. An example is shown in FIG. 7, which assumes the motion shift is set to block A1's motion. For each sub-block, after the motion information is obtained from the collocated block, including the reference indices and motion vectors, the motion vectors will be scaled to the current sub-block to align the reference picture of the collocated block with that of the current block.

In VVC draft 7, a combined subblock based merge list which contains both SbTVMP candidate and affine merge candidates is used for the signalling of subblock based merge mode. The SbTVMP mode is enabled/disabled by a sequence parameter set (SPS) flag. If the SbTMVP mode is enabled, the SbTMVP predictor is added as the first entry of the list of subblock based merge candidates, and followed by the affine merge candidates. The sub-block size in SbTMVP is fixed to be 8×8 and SbTMVP mode may be only applicable to CUs of which the width and height are both larger than or equal to 8 luma samples.

According to some embodiments consistent with the present disclosure, in addition to the normal merge mode and the SbTMVP mode, the merge mode with motion vector differences (MMVD) is also used. A MMVD flag is signalled after sending a merge flag to specify whether MMVD mode is used for a CU.

In MMVD, after a merge candidate is selected, it is further refined by the signaled MVD information. The further information includes a merge candidate flag, an index to specify motion magnitude, and an index for indication of motion direction. In MMVD mode, one of the first two candidates in the merge list is selected to be used as MV basis. The merge candidate flag is signaled to specify which one is used.

Figure 8:
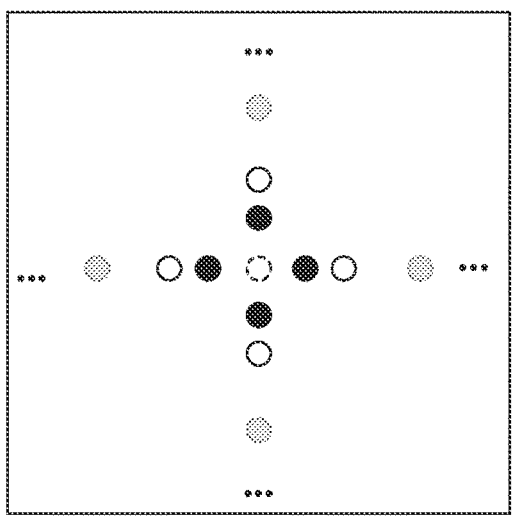
FIG. 8 is a schematic diagram illustrating exemplary merge mode with motion vector differences (MMVD) search points, consistent with some embodiments of the disclosure.
Figure 8:
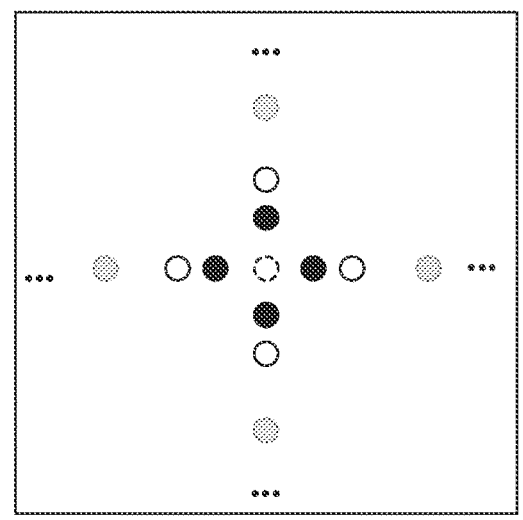

Distance index specifies motion magnitude information and indicate the pre-defined offset from the starting point. As shown in FIG. 8, an offset is added to either horizontal component or vertical component of starting MV. The relation of distance index and pre-defined offset is specified in Table 1.

TABLE 1

Exemplary relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | 1/4 | 1/2 | 1 | 2 | 4 | 8 | 16 | 32 |

Direction index represents the direction of the MVD relative to the starting point. The direction index can represent one of the four directions as shown in Table 2. It's noted that the meaning of MVD sign could vary according to the starting MVs. When the starting MVs is an uni-prediction MV or bi-prediction MVs with both lists pointing to the same side of the current picture (i.e. POCs of two references are both larger than the POC of the current picture, or are both smaller than the POC of the current picture), the sign in Table 2 specifies the sign of MV offset added to the starting MV. When the starting MVs is bi-prediction MVs with the two MVs pointing to the different sides of the current picture (i.e. the POC of one reference is larger than the POC of the current picture, and the POC of the other reference is smaller than the POC of the current picture), the sign in Table 2 specifies the sign of MV offset added to the list0 MV component of starting MV and the sign for the list1 MV has opposite value.

TABLE 2

| Sign of MV offset specified by direction index | | | | |
|---|---|---|---|---|
| Direction IDX | 00 | 01 | 10 | 11 |
| x-axis | + | − | N/A | N/A |
| y-axis | N/A | N/A | + | − |

In some embodiments consistent with the present disclosure, the symmetric MVD (SMVD) mode is also used for bi-prediction. SMVD mode may be only applied when the nearest reference picture in list-0 and the nearest reference picture in list-1 form a forward and backward pair of reference pictures or a backward and forward pair of reference pictures. When the SMVD mode flag is true, the MVP flag of list-0, MVD of list-0 and MVP flag of list-1 are explicitly signaled. The reference indices for list-0 and list-1 are set equal to the pair of nearest reference pictures, respectively. MVD of list-1 is derived according to the symmetric principle.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases} \quad \text{Eq. (6)}$$

In the encoder, symmetric MVD motion estimation starts with initial MV evaluation. A set of initial MV candidates comprising the MV is obtained from uni-prediction search, the MV obtained from bi-prediction search and the MVs from the AMVP list. The one with the lowest rate-distortion cost is chosen to be the initial MV for the symmetric MVD motion search.

Figure 9:
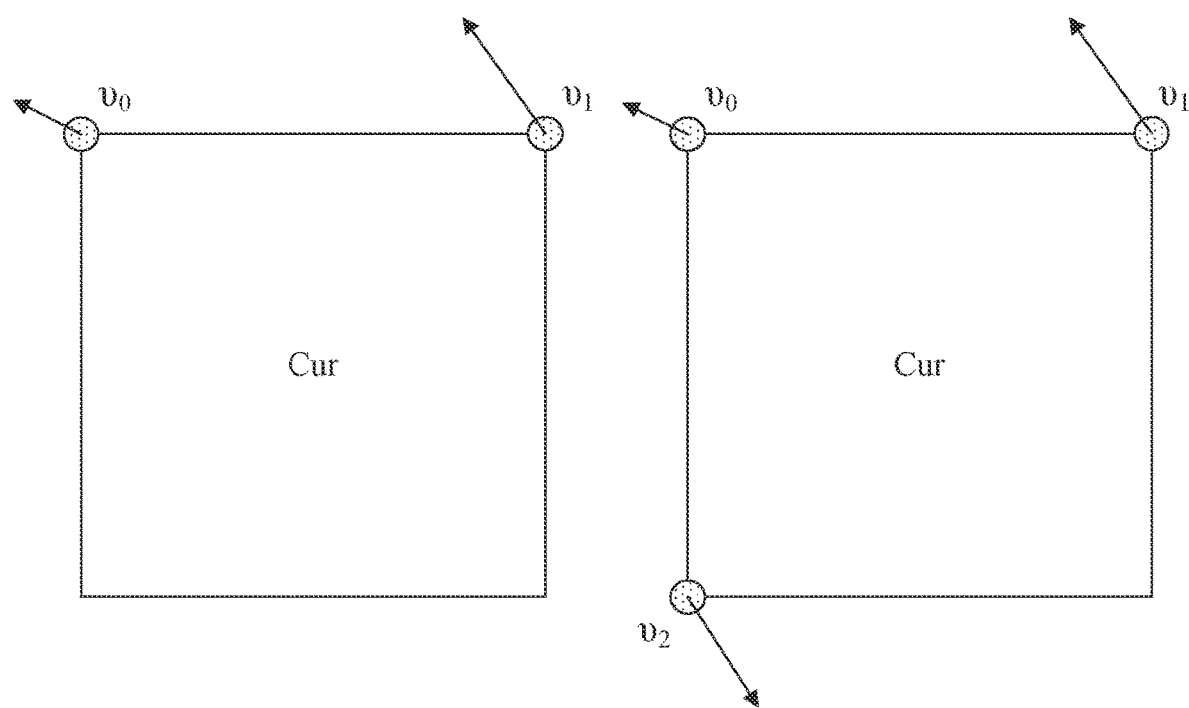
FIG. 9 is a schematic diagram illustrating exemplary affine motion models based on two control points and three control points, consistent with some embodiments of the disclosure.

The above prediction modes are based on the assumption of translation motion model. While in the real world, there are many kinds of motion, e.g. zoom in/out, rotation, perspective motions and the other irregular motions. In VVC, a block-based affine motion compensation prediction is applied to provide efficient prediction when these other types of motion occur. As shown in FIG. 9, the affine motion field of the block is described by motion information of two control point (4-parameter) or three control point motion vectors (6-parameter).

For 4-parameter affine motion model, motion vector at sample location (x, y) in a block is derived as:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases} \quad \text{Eq. (7)}$$

For 6-parameter affine motion model, motion vector at sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad \text{Eq. (8)}$$

where (mv0x, mv0y) is motion vector of the top-left corner control point, (mv1x, mv1y) is motion vector of the top-right corner control point, and (mv2x, mv2y) is motion vector of the bottom-left corner control point.

Figure 10:
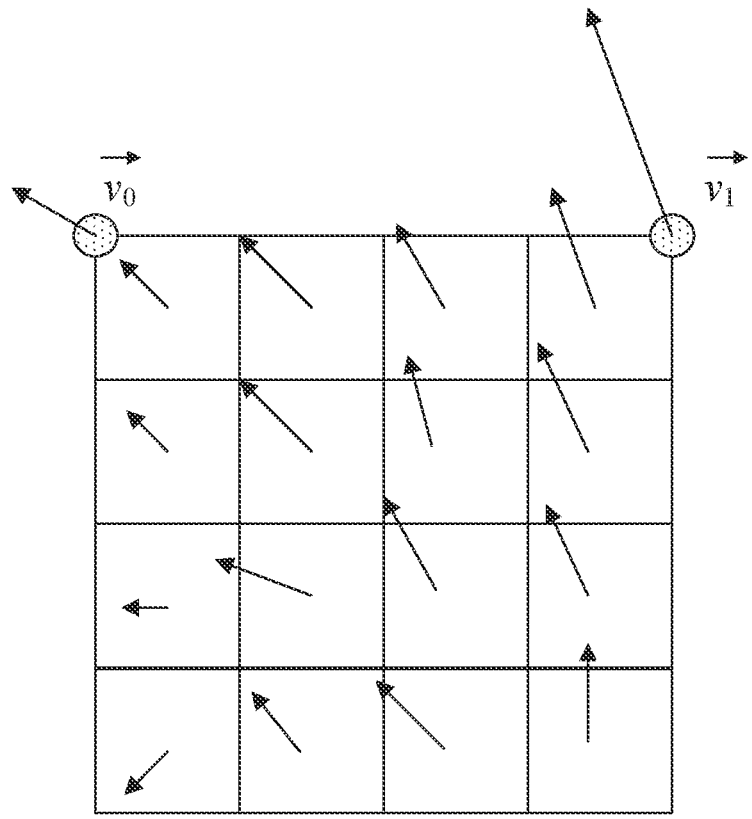
FIG. 10 is a schematic diagram illustrating exemplary affine motion vector fields of subblocks, consistent with some embodiments of the disclosure.

In order to simplify the motion compensation prediction, block based affine transform prediction is applied. To derive motion vector of each 4×4 luma subblock, the motion vector of the center sample of each subblock, as shown in FIG. 10, is calculated according to above equations, and rounded to 1/16 fraction accuracy. Then the motion compensation interpolation filters are applied to generate the prediction of each subblock with derived motion vector. The subblock size of chroma-components is also set to be 4×4. The MV of a 4×4 chroma subblock is calculated as the average of the MVs of the four corresponding 4×4 luma subblocks According to the generation of MVs of the control points (CPMV), affine motion compensation includes affine merge mode and affine AMVP mode.

In the affine merge mode, the CPMVs of the current CU is generated based on the motion information of the spatial neighboring CUs. These are referred to as the CPMV predictor (CPMVP). There can be up to five CPMVP candidates and an index is signalled to indicate the one to be used for the current CU. The following three types of CPMVP candidate are used to form the affine merge candidate list: 1) inherited affine merge candidates that are extrapolated from the CPMVs of the neighbour CUs; 2) constructed affine merge candidates CPMVs that are derived using the translational MVs of the neighbour CUs; and 3) zero MVs.

Figure 11:
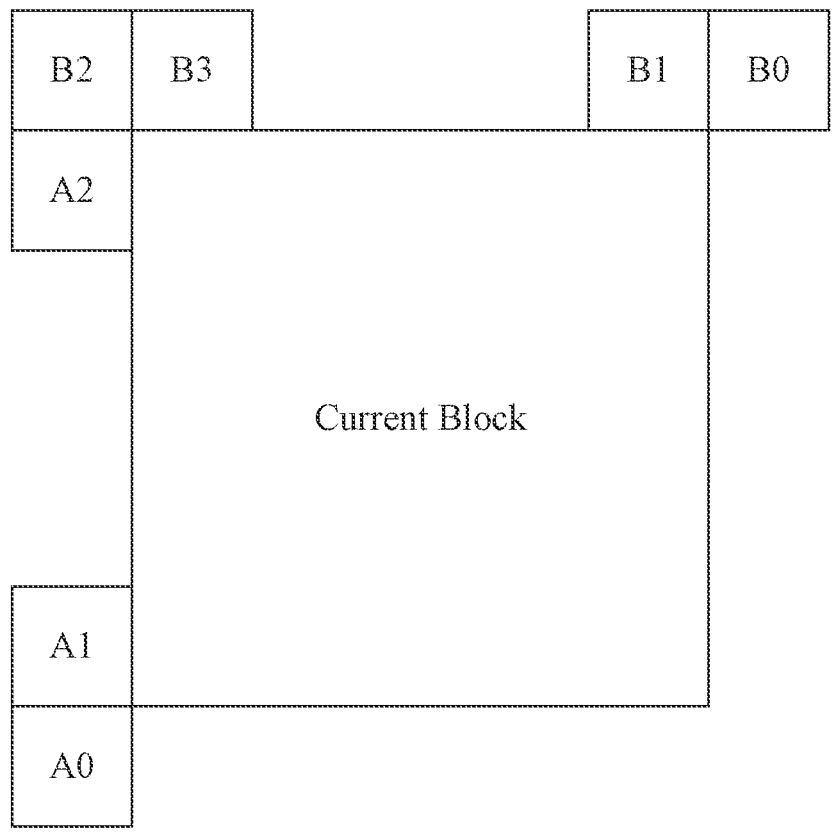
FIG. 11 is a schematic diagram illustrating exemplary candidate positions for an affine merge mode, consistent with some embodiments of the disclosure.
Figure 12:
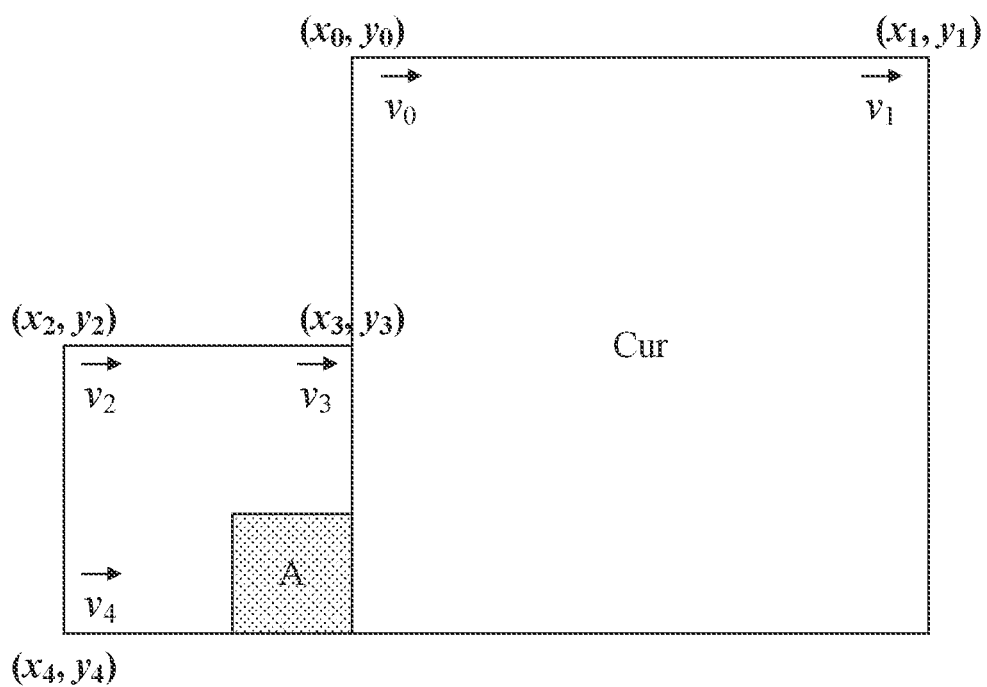
FIG. 12 is a schematic diagram illustrating exemplary control point motion vector (MV) inheritance, consistent with some embodiments of the disclosure.

In VVC draft 7, there are maximum two inherited affine candidates, which are derived from affine motion model of the neighboring blocks, one from left neighboring CUs and one from above neighboring CUs. The candidate blocks are shown in FIG. 11. For the left predictor, the scan order is A0→A1, and for the above predictor, the scan order is B0→B1→B2. Only the first inherited candidate from each side is selected. No pruning check is performed between two inherited candidates. When a neighboring affine CU is identified, its control point motion vectors are used to derive the CPMVP candidate in the affine merge list of the current CU. As shown in FIG. 12, if the neighbour left bottom block A is coded in affine mode, the motion vectors $v_2$, $v_3$ and $v_4$ of the top left corner, above right corner and left bottom corner of the CU which contains the block A are attained. When block A is coded with a 4-parameter affine model, the two CPMVs of the current CU are calculated according to $v_2$ and $v_3$. In case that block A is coded with 6-parameter affine model, the three CPMVs of the current CU are calculated according to $v_2$, $v_3$ and $v_4$.

Constructed affine candidate means the candidate is constructed by combining the neighbor translational motion information of each control point. The motion information for the control points is derived from the specified spatial neighbors and temporal neighbor. CPMVk (k=1, 2, 3, 4) represents the k-th control point. For CPMV1, the B2→B3→A2 blocks are checked and the MV of the first available block is used. For CPMV2, the B1→B0 blocks are checked and for CPMV3, the A1→A0 blocks are checked. Temporal motion vector predictor is used as CPMV4 if it's available. After MVs of four control points are attained, affine merge candidates are constructed based on the motion information. The following combinations of control point MVs are used to construct in the following order:

{CPMV1, CPMV2, CPMV3}, {CPMV1, CPMV2, CPMV4}, {CPMV1, CPMV3, CPMV4},
{CPMV2, CPMV3, CPMV4}, {CPMV1, CPMV2},
{CPMV1, CPMV3}

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

Affine AMVP mode can be applied for CUs with both width and height larger than or equal to 16. An affine flag in CU level is signalled in the bitstream to indicate whether affine AMVP mode is used and then another flag is signalled to indicate whether 4-parameter affine or 6-parameter affine. In this mode, the difference of the CPMVs of current CU and their predictors CPMVPs is signalled in the bitstream. The affine AVMP candidate list size is 2 and it is generated by using the following four types of CPMV candidate in order: 1) inherited affine AMVP candidates that extrapolated from the CPMVs of the neighbour CUs; 2) constructed affine AMVP candidates CPMVPs that are derived using the translational MVs of the neighbour CUs; 3) translational MVs from neighboring CUs: and 4) zero MVs.

The checking order of inherited affine AMVP candidates is the same as the checking order of inherited affine merge candidates. The main difference is that, for AMVP candidate, only the affine CU that has the same reference picture as the current block is considered. No pruning process is applied when inserting an inherited affine motion predictor into the candidate list.

Constructed AMVP candidate is derived from the specified spatial neighbors shown in FIG. 11. The same checking order is used as in affine merge candidate construction. In addition, reference picture index of the neighboring block is also checked. The first block in the checking order that is inter coded and has the same reference picture as the current CUs is used.

If affine AMVP candidates list is still less than 2 after inherited affine AMVP candidates and constructed AMVP candidate are checked, translational MVs from neighboring CUs are added to predict the control point MVs. Finally, zero MVs are used to fill the affine AMVP list if it is still not full.

In VVC draft 7, the DMVR process can improve the prediction accuracy by performing motion vector refinement at the decoder side. However, some drawbacks of the current DMVR are observed from the following aspects. First, in the current coding design, DMVR may be only applied to the normal merge mode. However, the DMVR principle can be also used for the other inter modes, such as MMVD, SMVD, SbTMVP, Affine mode and AMVP mode. Second, DMVR is processed on the 16×16 unit or 8×16/16×8 unit. The fixed size limits the potential performance of DMVR. Third, DMVR is processed by symmetric searching on the candidate points. This matching method may not be fit for all cases. Fourth, DMVR can be applied only to CUs coded by bi-prediction and the two reference pictures having the same distance from the current picture and are on different sides of the current picture in the temporal domain. This limitation limits the coding performance of DMVR.

According to the present disclosure, the following methods are provided to address the above issues.

According to some embodiments, a multi-level DMVR method can be used.

Figure 20:
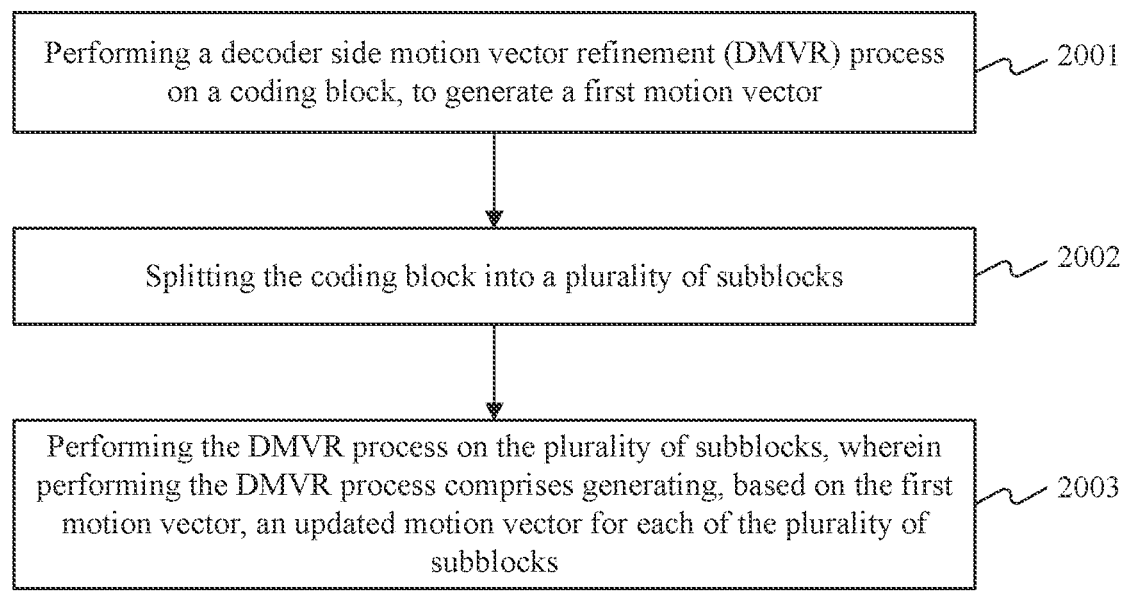
FIG. 20 is a flowchart of an exemplary computer-implemented method for processing video content, consistent with some embodiments of the disclosure.

FIG. 20 is a flowchart of an exemplary computer-implemented method for processing video content, consistent with some embodiments of the present disclosure. The method can be performed by a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform the method in FIG. 20. In some embodiments, the method can be implemented by a computer program product, embodied in a computer-readable medium, including computer-executable instructions, such as program code, executed by computers (e.g., apparatus 400 of FIG. 4). The method can include the following steps.

In step 2001, a DMVR process is performed on a coding block to generate a first MV.

Figure 13:
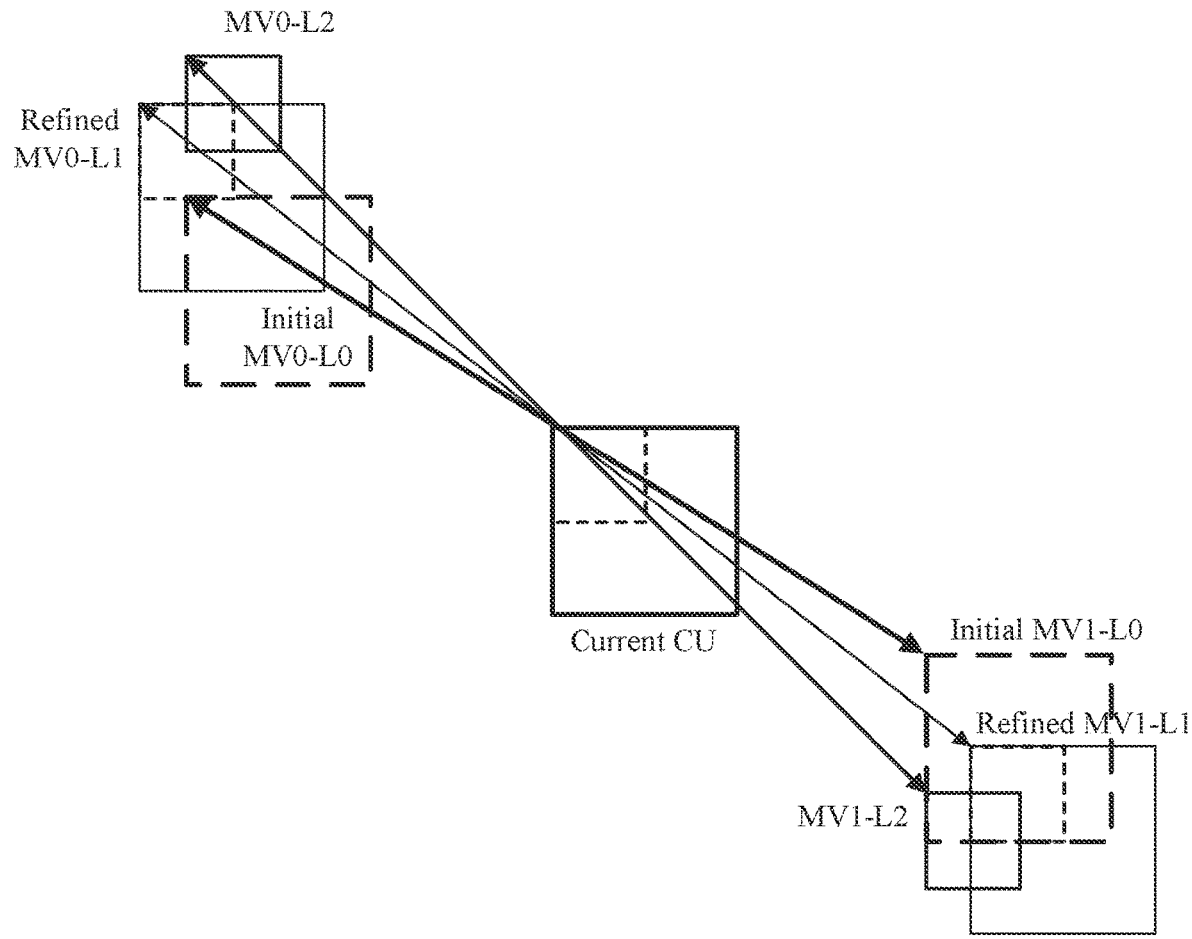
FIG. 13 is a schematic diagram illustrating an exemplary multi-level DMVR, consistent with some embodiments of the disclosure.

For example, FIG. 13 illustrates the two-level DMVR process. MV0-L0 and MV1-L0 denote the initial MVs obtained according to its inter mode for the current CU. DMVR is firstly conducted for the whole CU and the refined MVs, MV0-L1 and MV1-L1, are generated, as shown in FIG. 13. The DMVR process is performed on the current CU to generate MV0-L1 and MV1-L1.

In step 2002, the coding block is split into a plurality of subblocks.

In step 2003, the DMVR process is performed on the plurality of subblocks. The step of performing the DMVR process comprises generating an updated MV for each of the plurality of subblocks based on the first MV.

Referring back to FIG. 13, the CU is further divided into sub-blocks and the secondary DMVR is applied for each sub-block at the basis of MV0-L1 and MV1-L1. Taking the top-left sub-block as example, its MVs are converted into MV0-L2 and MV1-L2 after the secondary DMVR process. Therefore, each sub-block can find individual refined MVs after two-level DMVR. The DMVR process is performed on the top-left sub-block to generate MV0-L2 and MV1-L2 based on initial MVs, MV0-L0 and MV1-L0.

The proposed method supports flexible multi-level DMVR. In some embodiments, the depth of DMVR level can set to a fixed value, e.g. one, two, three or other values and stay constant during the encoding/decoding. In another embodiment, the depth of DMVR level can be set adaptively according to the CU size. For example, for the CUs with both width and height larger than 32, two-level DMVR process is applied. For the other CUs, one-level DMVR process is applied. The depth of DMVR level can also be set dynamically on the fly, depending on the DMVR distortion (e.g. SAD between the two predictions). If the SAD converges quickly at the first level, then second level DMVR may be skipped.

The proposed method also supports different partitioning shapes. For the block in each depth, it can be divided into sub-blocks of the next depth following quadtree or binary-tree partitioning. Moreover, the block in the current depth can also be split into multi sub-blocks by directly setting the sub-block size, such as 8×8, 16×16 and so on.

Figure 21:
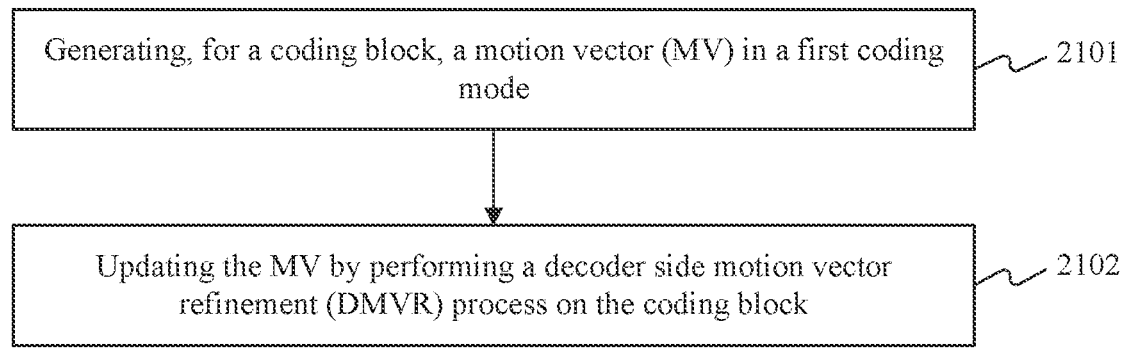
FIG. 21 is a flowchart of an exemplary computer-implemented method for processing video content, consistent with some embodiments of the disclosure.

FIG. 21 is a flowchart of an exemplary computer-implemented method for processing video content, consistent with some embodiments of the present disclosure. The method can be performed by a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform the method in FIG. 21. In some embodiments, the method can be implemented by a computer program product, embodied in a computer-readable medium, including computer-executable instructions, such as program code, executed by computers (e.g., apparatus 400 of FIG. 4). The method can include the following steps.

In step 2101, a MV is generated in a first coding mode for a coding block.

In some embodiments, the first coding mode is at least one of a symmetric motion vector difference (SMVD) mode, a merge mode with motion vector differences (MMVD), a subblock-based temporal motion vector prediction (SbTMVP) mode, an affine mode, an advanced motion vector prediction (AMVP) mode, and an adaptive motion vector range (AMVR) mode.

In step 2102, the MV is updated by performing a DMVR process on the coding block.

According to some embodiments, a template based DMVR process can be used.

In the VVC draft 7, DMVR is processed by searching the pairs of candidate points with minimal SAD cost, and the MV offsets should be symmetric and conform with the following equations.

$$MV0'=MVI0+MV\_offset \qquad \text{Eq. (9)}$$

$$MV1'=MVI1-MV\_offset \qquad \text{Eq. (10)}$$

Consistent with the present disclosure, a template based DMVR is proposed. Compared to the DMVR in VVC draft 7, the key differences lie in two aspects.

Figure 14:
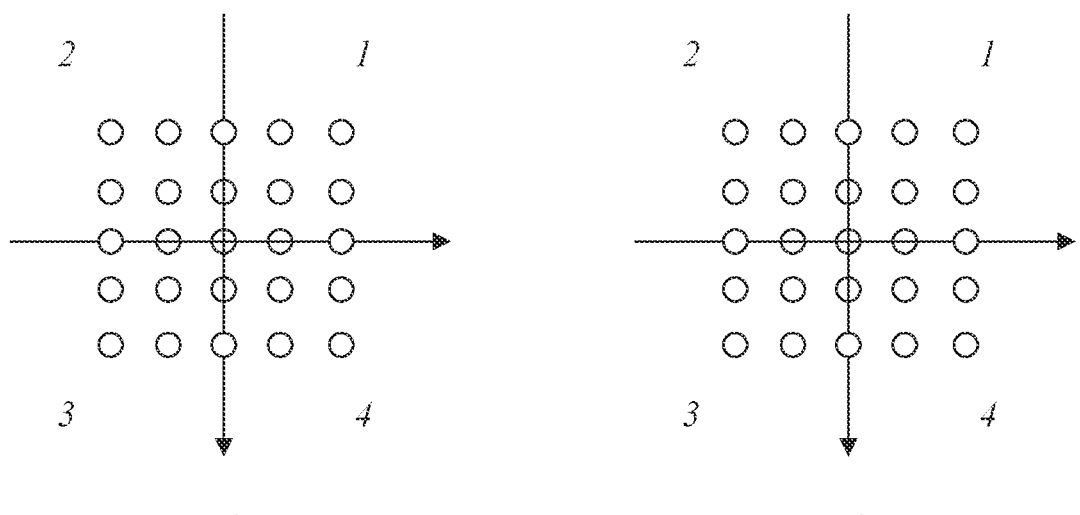
FIG. 14 is a schematic diagram illustrating exemplary directional symmetric MV offsets in DMVR, consistent with some embodiments of the disclosure.

In a first aspect, only the signs of MV offsets are limited to be symmetric. For example, if the sign of MV_offset0 is (+, −), the sign of MV_offset1 should be (−, +). Zero is termed as any sign. All the candidate points can be divided into four quadrants, as shown in FIG. 14. The quadrant pairs (1, 3), (2, 4), (3, 1) and (4, 2) are the candidate points.

In a second aspect, a matching cost (e.g., SAD) is computed between the candidate points and a template.

Referring back to FIG. 21, step 2102 of updating the MV by performing the DMVR process on the coding block can include the following sub-steps.

Figure 15:
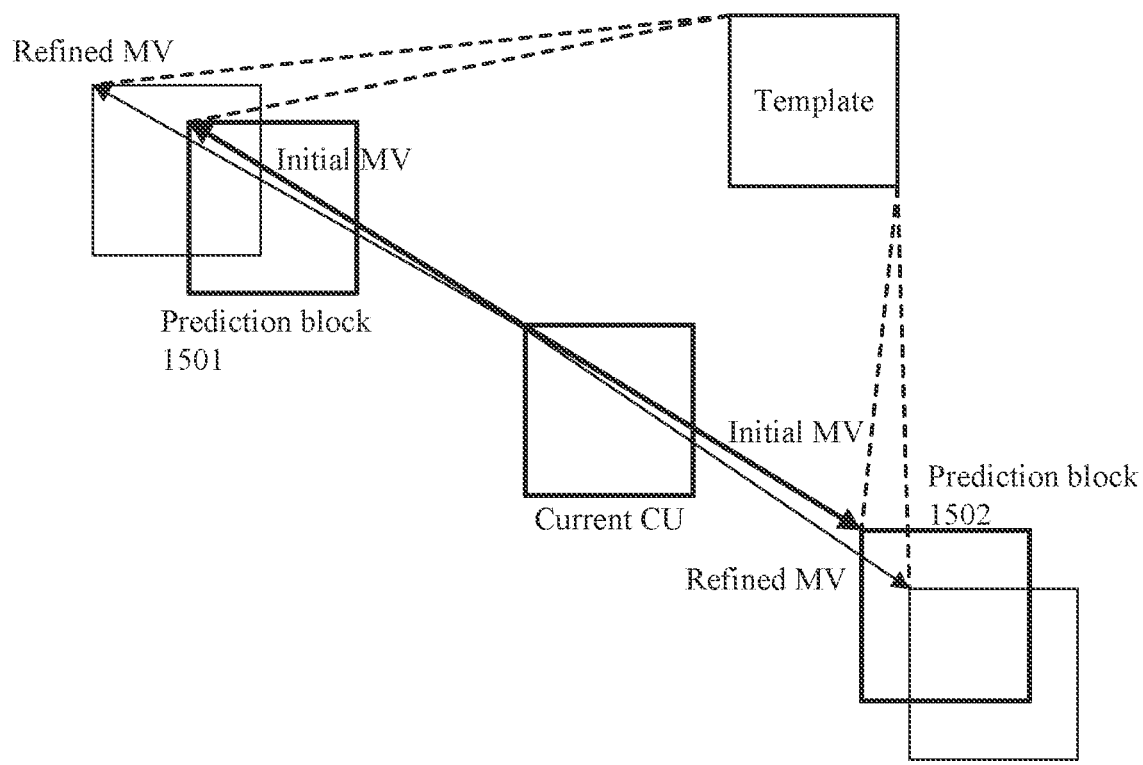
FIG. 15 is a schematic diagram illustrating exemplary template based DMVR, consistent with some embodiments of the disclosure.

In a first sub-step, a template is generated based on prediction blocks (e.g., prediction block 1501 and prediction block 1502 as shown in FIG. 15) within one or more reference pictures associated with the MV.

As shown in FIG. 15, a template is generated as the combination of the two prediction blocks a and b, from the initial MV0 of list0 and MV1 of list1. The combination method can include averaging the two initial prediction blocks directly or weighted averaging them if the CU is coded by weighted prediction mode.

In a second sub-step, matching costs of a plurality of search points within the one or more reference pictures are determined based on the template.

For the search points in symmetric quadrants, the matching cost (e.g. SAD) between the search point of list0 and the template and the matching cost (e.g. SAD) between the search point of list1 and the template are computed and added. After checking all candidate pairs, the MV offsets with minimal matching cost are selected and added to the original MVs to obtain the refined MVs.

Figure 16:
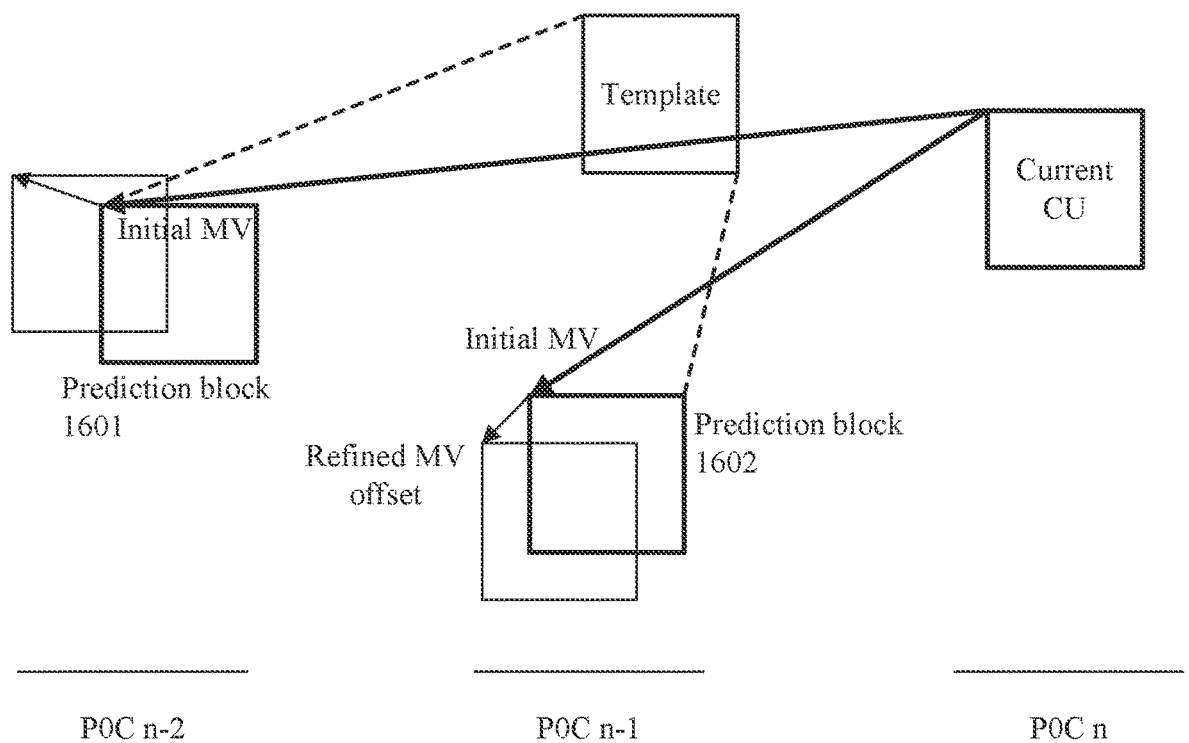
FIG. 16 is a schematic diagram illustrating exemplary template based DMVR for two forward reference frames, consistent with some embodiments of the disclosure.

In some embodiments, the one or more reference pictures are forward reference pictures of the coding block (e.g., prediction block 1601 and prediction block 1602 from two forward reference pictures as shown in FIG. 16).

According to some embodiments, extended template-based DMVR can be used. In VVC draft 7, DMVR may be only applied to the bi-prediction with one forward reference picture and one backward reference picture, and meanwhile the POC distances between each reference pictures and the current pictures are same. This limitation mainly comes from the matching principle of symmetric MV offsets. Moreover, DMVR in VVC is also not applied to the CUs coded by bi-prediction with CU-level weight (BCW) mode, because the matching cost during refinement is computed between the two initial prediction blocks which are treated equivalently.

For the template-based DMVR method described above, the above limitations can be removed, because the template based DMVR does not require symmetric values of MV offsets. Furthermore, the restriction of one forward reference frame and one backward reference frame can also be released. For example, as shown in FIG. 16, if there are two forward reference frames, the template can be generated by averaging or weighting prediction block 1601 and prediction block 1602 and then search the refined MVs according to the matching cost between the candidate block and the template on each reference frame respectively, which is similar to the behavior in the case of one forward and one backward reference frames.

More extensively, the template-based DMVR works well for the inter CUs with more than two MVs. As the example of three MVs, the template is obtained by averaging or weighting the three initial prediction blocks, and then refines each MV on its corresponding reference frame by minimizing the matching cost with the template, respectively.

The template based DMVR can also be combined with the current DMVR method in VVC. For example, if the two reference frames satisfy the requirement of symmetric POC distances, the DMVR method in VVC is used. For the other cases, the template based DMVR method is used.

Considering the template is generated by combining the initial prediction blocks, the weights of each prediction block during combining can be identical or different. By default, the weights used for generating template are the same with the weights in BCW if the CU is coded by BCW mode, otherwise, the weights used for generating template may be set to be the same, such as (½, ½) for two MVs, (⅓, ⅓, ⅓) for three MVs and so on, or may be set differently according to the quality of the prediction blocks (e.g., the quality of a prediction block may be considered higher if the reference block is coded using lower QP, or vice versa) where higher weights may be given to prediction blocks of higher quality.

As described above, the MV can generated in the first coding mode for a coding block. The first coding mode is at least one of a symmetric motion vector difference (SMVD) mode, a merge mode with motion vector differences (MMVD), a subblock-based temporal motion vector prediction (SbTMVP) mode, an affine mode, an advanced motion vector prediction (AMVP) mode, and an adaptive motion vector range (AMVR) mode.

According to some embodiments, DMVR can be extended to SMVD mode. In these embodiments, DMVR is applied for inter CUs except all the MVs are explicitly signaled.

In VVC draft 7, the AMVP mode will explicitly signal the MVs and the normal merge mode derives the MVs from the candidate list which is constructed according the neighboring blocks' MVs. For the CUs coded by normal merge mode, the MVs are not searched by the motion estimation at the encoder and hence refinement on the merged MVs may provide a better pair of MVs. Of course, the refinement should follow some physical motion principles, such as the symmetric principle under the assumption of translational motion. If the MVs are obtained by motion estimation at the encoder, decoder-side MV refinement is unnecessary because the MV are the optimal one compared to its adjacent search points.

For the SMVD mode, the MV of list-0 is obtained by motion estimation and explicitly signaled. The MVP and reference frame of list-1 will also be signaled but the MVD of list-1 is derived implicitly according to the symmetric MVD values of list-0. Due to this assumption, the final bi-prediction may not be of high quality and hence this embodiment proposes to extend DMVR on the SMVD mode.

After obtaining the initial two MVs in SMVD mode, DMVR is conducted to refine them. The DMVR process may be the same DMVR method in VVC, or the template based DMVR method.

In addition, one more special DMVR mechanism can be used for the SMVD mode. That is to fix the explicitly signaled MV of list-0 as the final MV, and only to refine the MV of list-1.

Referring back to FIG. 21, step 2102 of updating the MV by performing the DMVR process on the coding block can include the following sub-steps when the first coding mode is SMVD mode. The MV comprises a first initial MV in a first list of pictures (e.g., explicitly signaled MV of list-0) and a second initial MV in a second list of pictures (e.g., the MV of list-1).

In a first sub-step, a plurality of search points are searched for in a plurality of coding blocks within a range of the second initial MV. For example, the neighboring blocks around the initial MV of list-1 are searched.

In a second sub-step, the second initial MV is updated with a MV candidate associated with a search point among the plurality of search points. A matching cost of the search point satisfies a condition.

Similar to the DMVR in VVC, taking the prediction block inferred by MV of list-0 as the template, the neighboring blocks around the initial MV of list-1 are searched and the best one minimizing the matching cost serves as the final MV of list-1. The matching cost of each search point in the neighboring blocks is calculated. The MV at the search point with the minimum matching cost among all search points is identified for updating the initial MV of list-1.

Template based DMVR can also be used in this circumstance. Based on the prediction blocks referred by the two MVs after SMVD process, template is generated by averaging the two prediction blocks. The matching costs between the neighboring blocks around MV of list-1 and the generated template are computed and the minimal one is selected as the final MV of list-1, while the MV of list-0 keeps identical with the explicitly signaled value.

According to some embodiments, DMVR can also be extended to MMVD mode. In these embodiments, the combination of DMVR and MMVD mode is proposed.

In these embodiments, DMVR is applied for inter CUs except all the MVs are explicitly signaled. For the MMVD mode, the MVs are obtained by adding MVD to the MV basis. It is worth noting that the MV basis is selected from the merge candidates, which means it is generated without motion estimation. Moreover, MVD is selected from a limited pre-defined set. Therefore, the MVD is not precise as the motion estimation but should be better than the normal merge mode.

In the proposed combination of DMVR and MMVD, it contains two procedures: DMVR on the MV basis and DMVR on the whole MV. These two procedures can be used together or separately. The DMVR method used in the proposed combination of DMVR and MMVD can be the same as the DMVR method in VVC or the methods described above in connection with multi-level DMVR and template based DMVR.

With respect to the DMVR on the whole MV, one more modification is proposed here. Considering all the MVD points are compared and the best one is signaled, the refined MV is close it and far from other MVD points.

Referring back to FIG. 21, step 2102 of updating the MV by performing the DMVR process on the coding block can include the following sub-steps when the MV is generated in the MMVD.

When the MV is generated in the MMVD, a Motion Vector Difference (MVD) point is signaled in a bitstream is received.

In a first sub-step, a reference picture that comprises a plurality of MVD points is divided into a plurality of regions. Each region contains one MVD point.

Figure 17:
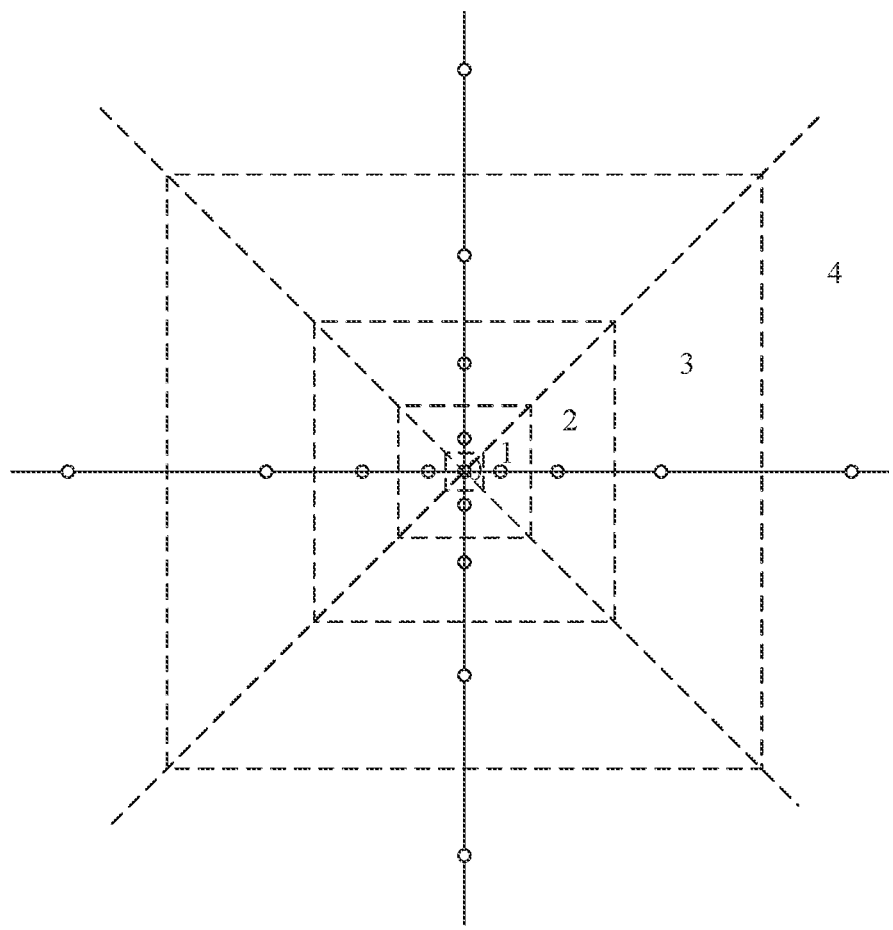
FIG. 17 is a schematic diagram illustrating an exemplary DMVR search region in a combination of DMVR and MMVD, consistent with some embodiments of the disclosure.

As shown in FIG. 17, a whole region is divided into eight bands (0, 1, 2, 3 . . . , 7) specified by neighboring dotted squares, and each band contains four MVD points with the same distance index. For each band, it is further divided into four regions by the 45° and 135° lines. Finally, each region contains only one MVD point.

In a second sub-step, a plurality of search points is searched for within a first region, among the plurality of regions, corresponding to the signaled MVD point.

If one MVD point is selected in the MMVD mode, the corresponding region serves as the DMVR searching region.

According to some embodiments, DMVR can also be extended to SbTMVP mode. With respect to the SbTMVP mode, the motion compensation is conducted on the sub-block level and the MV of each sub-block are derived from the motion information of spatial and temporal neighboring blocks. For the CUs coded by SbTMVP mode, MVs at sub-block level provide better prediction than the normal merge mode, but in the view of each sub-block, the MVs are derived without encoder-side motion estimation. Therefore, this embodiment also proposes to apply DMVR on the SbTMVP mode.

Referring back to FIG. 21, in some embodiments, step 2102 of updating the MV by performing the DMVR process on the coding block can include the following sub-steps when the MV is generated in the SbTMVP mode.

According to the above description of SbTMVP mode, a motion shift is first derived to identify the position of collocated block. This motion shift comes from the neighboring block A1 if A1 has a motion vector that uses the collocated picture as its reference picture. Otherwise, (0, 0) is set as the motion shift. Then, the sub-block MVs in the current block are obtained from the temporal block inferred by the motion shift.

In some embodiments, the proposed DMVR used for SbTMVP mode mainly has two procedures.

Figure 18:
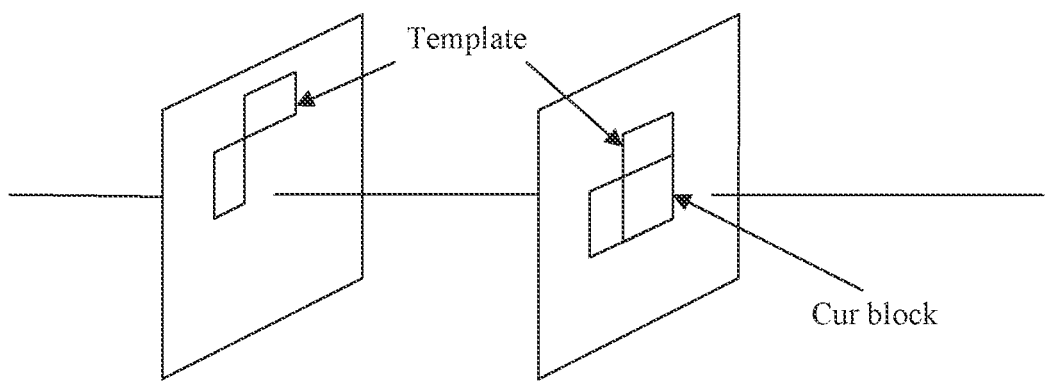
FIG. 18 is a schematic diagram illustrating exemplary neighboring blocks of a coding block, consistent with some embodiments of the disclosure.

In a first sub-step, a plurality of templates are generated based on a plurality of neighboring samples of the coding block (e.g., the above and left neighboring samples of the current block as shown in FIG. 18) and a plurality of neighboring samples of a reference block (e.g., the neighboring samples of the reference block as shown in FIG. 18).

Firstly, the motion shift is refined by taking the neighboring samples as the template. As shown in FIG. 18, the above and left neighboring samples (one line/column or more lines/columns) of the current block and the neighboring samples of the reference block serve as the templates.

In a second sub-step, a plurality of MV candidates are searched for within a range of the motion shift for updating the motion shift.

Taking the initial motion shift as the center, the surrounding MVs are checked and the best one minimizing the matching cost between the templates are selected and serve as the final motion shift.

Secondly, the initial sub-block MVs in the current block are obtained from the temporal block inferred by the refined motion shift, and DMVR is sequentially conducted for each sub-block. This DMVR process can be the template based DMVR method or same with the DMVR method in VVC.

The above two procedures, including the refinement of motion shift and the refinement of sub-block MV, can be applied together or separately. With respect to second procedure, namely the DMVR process of sub-block MVs, a further optimization is proposed here. Though SbTMVP supports each sub-block deriving individual MV from the temporal reference block, there exists the case that the adjacent sub-blocks have the same initial MVs. Applying DMVR for each sub-block is feasible at the cost of huge complexity. To reduce the computational complexity, adjacent sub-blocks having the same motion information can be combined into a whole region and then DMVR is performed on the combined region as a whole.

According to some embodiments, DMVR can also be extended to affine mode.

Referring back to FIG. 21, in some embodiments, step 2102 of updating the MV by performing the DMVR process on the coding block can include the following sub-steps when the MV is generated in the affine mode.

In a first sub-step, the coding block is split into a plurality of subblocks.

In a second sub-step, the DMVR process is performed on the plurality of subblocks to generate a subblock MV for each of the plurality of subblocks for updating the MV based on each subblock MV.

For the affine mode, the MVs of control points are obtained by affine merge or affine AMVP and the MVs of each sub-block are derived according to the MVs of control points. In this way, the MVs of each sub-block in affine mode are not produced by encoder-side motion estimation and hence it is proposed to apply DMVR to the affine mode at the sub-block level. The DMVR method applied to the affine mode at the sub-block level can be the same as the DMVR method in VVC or the above-described template based DMVR method.

DMVR can also be used to obtain better MVs of control points. No matter two control points or three control points are used, the MVs of all control points will own the same reference frames (one reference frame if uni-prediction is used, or two reference frames if bi-prediction is used). Therefore, the proposed DMVR is conducted on the same reference list among different control points. For example, there are three control points and the MVs are labelled as (MV_A_L0, MV_A_L1), (MV_B_L0, MV_B_L1) and (MV_C_L0, MV_C_L1). We select {MV_A_L0, MV_B_L0, MV_C_L0} and {MV_A_L1, MV_B_L1, MV_C_L1} to do DMVR separately. Considering that the MVs refer to the same reference frame, the DMVR in VVC cannot be used and hence the template based DMVR method is applied. The template is generated by averaging the prediction blocks referred to by the initial MV set.

Figure 19:
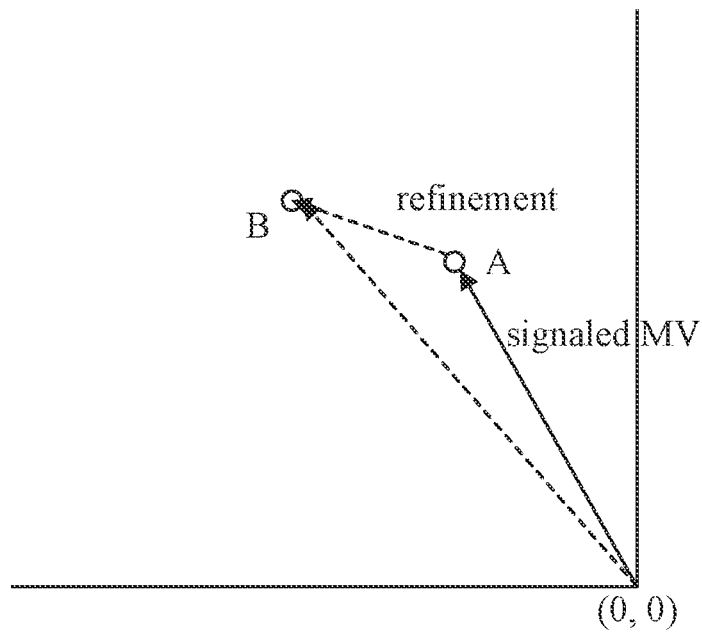
FIG. 19 is a schematic diagram illustrating an exemplary combination between DMVR and advanced motion vector prediction (AMVP), consistent with some embodiments of the disclosure.

According to some embodiments, DMVR can also be extended to AMVP mode. In these embodiments, the DMVR combined with AMVP mode is proposed. In the above description, it is discussed that DMVR cannot achieve better MV if the initial MV is obtained by motion estimation in the encoder and transmitted explicitly. However, DMVR can be used to reduce the coding bits of signalling MV for the bi-prediction case. Denote the first MV and second MV as MV_L0 and MV_L1, respectively. After MV_L0 is obtained, DMVR can be applied during the motion estimation of MV_L1. As shown in FIG. 19, if the current check point is A, the MV_A and MV_L0 serve as the initial two MVs, and DMVR is applied to refine MV_L1 from A to B. The distortion of point B and the bits of signaling point A are computed as the rate-distortion cost of point A in motion estimation. Finally, the point with minimal cost is the result of motion estimation. In this way, it is probable that MV_L1 is signalled with less bits.

According to some embodiments, during the DMVR in motion estimation of MV_L1, template based DMVR method can be always used while the DMVR method in VVC may be only used when the reference frames of MV_L0 and MV_L1 satisfy the restriction of symmetric POC distances.

According to some embodiments, DMVR can also be extended to adaptive motion vector range (AMVR) mode. AMVR is a coding tool that signals the motion vectors in different motion vector resolutions, e.g., ¼-pel, half-pel, full-pel, 4-pel, etc. resolutions. As the motion vector resolution becomes coarser, the signaling cost is reduced, however, the prediction quality may be reduced as well.

Referring back to FIG. 21, in some embodiments, when the MV is generated in the DMVR mode, step 2102 of updating the MV by performing the DMVR process on the coding block can include the following step: based on the MV having a first resolution, a plurality of MV candidates in a second resolution is searched for. The second resolution is finer than the first resolution.

In this disclosure, it is proposed to combine DMVR with the concept of AMVR, such that signaling cost may be reduced by using a coarser motion vector resolution, but prediction quality can be maintained using DMVR that refines the signaled motion vectors to a finer resolution. For example, if motion vectors are signaled in the integer pel resolution, then DMVR can be applied to search for fractional pel motion vectors around the signalled MV, e.g. to become ¼-pel or even ¹⁄₁₆-pel resolution. As another example, motion vectors can be signalled in 4-pel resolution, and DMVR may be performed to refine the MVs to become full-pel resolution, or even down to ¼ or ¹⁄₁₆ pel resolution. The conventional DMVR may be applied in this embodiment, or the template DMVR may be applied to perform the search.

It is appreciated that the above embodiments can be combined during implementation.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

The disclosed embodiments may further be described using the following clauses:

1. A computer-implemented method for processing video content, comprising:
   generating, for a coding block, a motion vector (MV) in a first coding mode; and
   updating the MV by performing a decoder side motion vector refinement (DMVR) process on the coding block.
2. The method of clause 1, wherein updating the MV by performing the DMVR process on the coding block comprises:
   generating a template based on prediction blocks within one or more reference pictures associated with the MV; and
   determining, based on the template, matching costs of a plurality of search points within the one or more reference pictures.
3. The method of clause 2, wherein
   the one or more reference pictures are forward reference pictures of the coding block.
4. The method of clause 1, wherein the first coding mode is a symmetric motion vector difference (SM VD) mode, and updating the MV comprises:
   in response to a first initial MV in a first list of pictures and a second initial MV in a second list of pictures being generated in the SMVD mode and the first initial MV being signaled in a bitstream,
   searching for a plurality of search points in a plurality of neighboring coding blocks of the second initial MV, and
   updating the second initial MV with a MV candidate associated with a search point among the plurality of search points.
5. The method of clause 1, wherein the first coding mode is a merge mode with motion vector differences (MMVD), and updating the MV comprises:
   in response to the MV being generated in MMVD,
   dividing a reference picture comprising a plurality of MVD points into a plurality of regions, wherein each region contains one MVD point, and
   searching for a plurality of search points within a first region among the plurality of regions, the first region corresponding to a MVD point that is signaled in a bitstream.
6. The method of clause 1, wherein the first coding mode is a subblock-based temporal motion vector prediction (SbTMVP) mode, and updating the MV comprises:
   in response to a motion shift comprised in the MV being generated in the SbTMVP mode to indicate a position of a collocated picture,
   generating a plurality of templates based on a plurality of neighboring samples of the coding block and a plurality of neighboring samples of a reference block, and
   searching for a plurality of MV candidates within a range of the motion shift for updating the motion shift.
7. The method of clause 1, wherein the first coding mode is an affine mode, and updating the MV comprises:
   in response to the MV being generated in the affine mode,
   splitting the coding block into a plurality of subblocks, and
   performing the DMVR process on the plurality of subblocks to generate a subblock MV for each of the plurality of subblocks for updating the MV based on each subblock MV.
8. The method of clause 1, wherein the first coding mode is an adaptive motion vector range (AMVR) mode, and updating the MV comprises:
   in response to the MV being generate in the AMVR mode,
   searching for, based on the MV having a first resolution, a plurality of MV candidates in a second resolution, wherein the second resolution is finer than the first resolution for updating the MV.
9. A computer-implemented method for processing video content, comprising:
   performing a decoder side motion vector refinement (DMVR) process on a coding block, to generate a first motion vector;
   splitting the coding block into a plurality of subblocks; and
   performing the DMVR process on the plurality of subblocks, wherein performing the DMVR process comprises generating, based on the first motion vector, an updated motion vector for each of the plurality of subblocks.
10. An apparatus for processing video content, comprising:
    a memory storing a set of instructions; and
    one or more processors configured to execute the set of instructions to cause the apparatus to perform:
    generating, for a coding block, a motion vector (MV) in a first coding mode; and
    updating the MV by performing a decoder side motion vector refinement (DMVR) process on the coding block.
11. The apparatus of clause 10, wherein updating the MV by performing the DMVR process on the coding block comprises:
    generating a template based on prediction blocks within one or more reference pictures associated with the MV; and
determining, based on the template, matching costs of a plurality of search points within the one or more reference pictures.
12. The apparatus of clause 11, wherein
    the one or more reference pictures are forward reference pictures of the coding block.
13. The apparatus of clause 10, wherein the first coding mode is a symmetric motion vector difference (SMVD) mode, and updating the MV comprises:
    in response to a first initial MV in a first list of pictures and a second initial MV in a second list of pictures being generated in the SMVD mode and the first initial MV being signaled in a bitstream,
    searching for a plurality of search points in a plurality of neighboring coding blocks of the second initial MV, and updating the second initial MV with a MV candidate associated with a search point among the plurality of search points.

14. The apparatus of clause 10, wherein the first coding mode is a merge mode with motion vector differences (MMVD), and updating the MV comprises:

in response to the MV being generated in MMVD, dividing a reference picture comprising a plurality of MVD points into a plurality of regions, wherein each region contains one MVD point, and searching for a plurality of search points within a first region among the plurality of regions, the first region corresponding to a MVD point that is signaled in a bitstream.

15. The apparatus of clause 10, wherein the first coding mode is a subblock-based temporal motion vector prediction (SbTMVP) mode, and updating the MV comprises:

in response to a motion shift comprised in the MV being generated in the SbTMVP mode to indicate a position of a collocated picture, generating a plurality of templates based on a plurality of neighboring samples of the coding block and a plurality of neighboring samples of a reference block, and searching for a plurality of MV candidates within a range of the motion shift for updating the motion shift.

16. The apparatus of clause 10, wherein the first coding mode is an affine mode, and updating the MV comprises:

in response to the MV being generated in the affine mode, splitting the coding block into a plurality of subblocks, and performing the DMVR process on the plurality of subblocks to generate a subblock MV for each of the plurality of subblocks for updating the MV based on each subblock MV.

17. The apparatus of clause 10, wherein the first coding mode is an adaptive motion vector range (AMVR) mode, and updating the MV comprises:

in response to the MV being generate in the AMVR mode, searching for, based on the MV having a first resolution, a plurality of MV candidates in a second resolution, wherein the second resolution is finer than the first resolution for updating the MV.

18. An apparatus for processing video content, comprising:

a memory storing a set of instructions; and one or more processors configured to execute the set of instructions to cause the apparatus to perform:

performing a decoder side motion vector refinement (DMVR) process on a coding block, to generate a first motion vector;

splitting the coding block into a plurality of subblocks; and performing the DMVR process on the plurality of subblocks, wherein performing the DMVR process comprises generating, based on the first motion vector, an updated motion vector for each of the plurality of subblocks.

19. A non-transitory computer readable medium that stores a set of instructions that is executable by at least one processor of a computer to cause the computer to perform a method for processing video content, the method comprising:

generating, for a coding block, a motion vector (MV) in a first coding mode; and updating the MV by performing a decoder side motion vector refinement (DMVR) process on the coding block.

20. The computer readable medium of clause 19, wherein updating the MV by performing the DMVR process on the coding block comprises:

generating a template based on prediction blocks within one or more reference pictures associated with the MV; and determining, based on the template, matching costs of a plurality of search points within the one or more reference pictures.

21. The computer readable medium of clause 19, wherein the one or more reference pictures are forward reference pictures of the coding block.

22. The computer readable medium of clause 19, wherein the first coding mode is a symmetric motion vector difference (SM VD) mode, and updating the MV comprises:

in response to a first initial MV in a first list of pictures and a second initial MV in a second list of pictures being generated in the SMVD mode and the first initial MV being signaled in a bitstream, searching for a plurality of search points in a plurality of neighboring coding blocks of the second initial MV, and updating the second initial MV with a MV candidate associated with a search point among the plurality of search points.

23. The computer readable medium of clause 19, wherein the first coding mode is a merge mode with motion vector differences (MMVD), and updating the MV comprises:

in response to the MV being generated in MMVD, dividing a reference picture comprising a plurality of MVD points into a plurality of regions, wherein each region contains one MVD point, and searching for a plurality of search points within a first region among the plurality of regions, the first region corresponding to a MVD point that is signaled in a bitstream.

24. The computer readable medium of clause 19, wherein the first coding mode is a subblock-based temporal motion vector prediction (SbTMVP) mode, and updating the MV comprises:

in response to a motion shift comprised in the MV being generated in the SbTMVP mode to indicate a position of a collocated picture, generating a plurality of templates based on a plurality of neighboring samples of the coding block and a plurality of neighboring samples of a reference block, and searching for a plurality of MV candidates within a range of the motion shift for updating the motion shift.

25. The computer readable medium of clause 19, wherein the first coding mode is an affine mode, and updating the MV comprises:

in response to the MV being generated in the affine mode, splitting the coding block into a plurality of subblocks, and performing the DMVR process on the plurality of subblocks to generate a subblock MV for each of the plurality of subblocks for updating the MV based on each subblock MV.

26. The computer readable medium of clause 19, wherein the first coding mode is an adaptive motion vector range (AMVR) mode, and updating the MV comprises:

in response to the MV being generate in the AMVR mode, searching for, based on the MV having a first resolution, a plurality of MV candidates in a second resolution, wherein the second resolution is finer than the first resolution for updating the MV.

27. A non-transitory computer readable medium that stores a set of instructions that is executable by at least one processor of a computer to cause the computer to perform a method for processing video content, the method comprising:
performing a decoder side motion vector refinement (DMVR) process on a coding block, to generate a first motion vector;
splitting the coding block into a plurality of subblocks; and
performing the DMVR process on the plurality of subblocks, wherein performing
the DMVR process comprises generating, based on the first motion vector, an updated motion vector for each of the plurality of subblocks.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A computer-implemented method for processing video content, comprising:
generating, for a coding block, a motion vector (MV) in a first coding mode, the first mode being at least one of a symmetric motion vector difference (SMVD) mode, a merge mode with motion vector differences (MMVD), a subblock-based temporal motion vector prediction (SbTMVP) mode, an affine mode, or an adaptive motion vector range (AMVR) mode; and
updating the MV by performing a decoder side motion vector refinement (DMVR) process on the coding block, wherein updating the MV by performing the DMVR process on the coding block comprises:
generating a template based on prediction blocks within one or more reference pictures associated with the MV; and
determining, based on the template, matching costs of a plurality of search points within the one or more reference pictures.

2. The method of claim 1, wherein
the one or more reference pictures are forward reference pictures of the coding block.

3. The method of claim 1, wherein the first coding mode is the SMVD mode, and updating the MV comprises:
in response to a first initial MV in a first list of pictures and a second initial MV in a second list of pictures being generated in the SMVD mode and the first initial MV being signaled in a bitstream,
searching for a plurality of search points in a plurality of neighboring coding blocks of the second initial MV, and
updating the second initial MV with a MV candidate associated with a search point among the plurality of search points.

4. The method of claim 1, wherein the first coding mode is the MMVD, and updating the MV comprises:
in response to the MV being generated in the MMVD,
dividing a reference picture comprising a plurality of MVD points into a plurality of regions, wherein each region contains one MVD point, and
searching for a plurality of search points within a first region among the plurality of regions, the first region corresponding to a MVD point that is signaled in a bitstream.

5. The method of claim 1, wherein the first coding mode is the SbTMVP mode, and updating the MV comprises:
in response to a motion shift comprised in the MV being generated in the SbTMVP mode to indicate a position of a collocated picture,
generating a plurality of templates based on a plurality of neighboring samples of the coding block and a plurality of neighboring samples of a reference block, and
searching for a plurality of MV candidates within a range of the motion shift for updating the motion shift.

6. The method of claim 1, wherein the first coding mode is the affine mode, and updating the MV comprises:
in response to the MV being generated in the affine mode, splitting the coding block into a plurality of subblocks, and
performing the DMVR process on the plurality of subblocks to generate a subblock MV for each of the plurality of subblocks for updating the MV based on each subblock MV.

7. The method of claim 1, wherein the first coding mode is the AMVR mode, and updating the MV comprises:
in response to the MV being generate in the AMVR mode, searching for, based on the MV having a first resolution, a plurality of MV candidates in a second resolution, wherein the second resolution is finer than the first resolution for updating the MV.

8. An apparatus for processing video content, comprising:
a memory storing a set of instructions; and
one or more processors configured to execute the set of instructions to cause the apparatus to perform:
generating, for a coding block, a motion vector (MV) in a first coding mode, the first mode being at least one of a symmetric motion vector difference (SMVD) mode, a merge mode with motion vector differences (MMVD), a subblock-based temporal motion vector prediction (SbTMVP) mode, an affine mode, or an adaptive motion vector range (AMVR) mode; and updating the MV by performing a decoder side motion vector refinement (DMVR) process on the coding block, wherein updating the MV by performing the DMVR process on the coding block comprises:

generating a template based on prediction blocks within one or more reference pictures associated with the MV; and determining, based on the template, matching costs of a plurality of search points within the one or more reference pictures.

9. The apparatus of claim 8, wherein the first coding mode is the SMVD mode, and updating the MV comprises:

in response to a first initial MV in a first list of pictures and a second initial MV in a second list of pictures being generated in the SMVD mode and the first initial MV being signaled in a bitstream, searching for a plurality of search points in a plurality of neighboring coding blocks of the second initial MV, and updating the second initial MV with a MV candidate associated with a search point among the plurality of search points.

10. The apparatus of claim 8, wherein the first coding mode is the MMVD, and updating the MV comprises:

in response to the MV being generated in the MMVD, dividing a reference picture comprising a plurality of MVD points into a plurality of regions, wherein each region contains one MVD point, and searching for a plurality of search points within a first region among the plurality of regions, the first region corresponding to a MVD point that is signaled in a bitstream.

11. The apparatus of claim 8, wherein the first coding mode is the SbTMVP mode, and updating the MV comprises:

in response to a motion shift comprised in the MV being generated in the SbTMVP mode to indicate a position of a collocated picture, generating a plurality of templates based on a plurality of neighboring samples of the coding block and a plurality of neighboring samples of a reference block, and searching for a plurality of MV candidates within a range of the motion shift for updating the motion shift.

12. The apparatus of claim 8, wherein the first coding mode is the affine mode, and updating the MV comprises:

in response to the MV being generated in the affine mode, splitting the coding block into a plurality of subblocks, and performing the DMVR process on the plurality of subblocks to generate a subblock MV for each of the plurality of subblocks for updating the MV based on each subblock MV.

13. The apparatus of claim 8, wherein the first coding mode is the AMVR mode, and updating the MV comprises:

in response to the MV being generate in the AMVR mode, searching for, based on the MV having a first resolution, a plurality of MV candidates in a second resolution, wherein the second resolution is finer than the first resolution for updating the MV.

14. A non-transitory computer readable medium that stores a set of instructions that is executable by at least one processor of a computer to cause the computer to perform a method for processing video content, the method comprising:

generating, for a coding block, a motion vector (MV) in a first coding mode, the first mode being at least one of a symmetric motion vector difference (SMVD) mode, a merge mode with motion vector differences (MMVD), a subblock-based temporal motion vector prediction (SbTMVP) mode, an affine mode, or an adaptive motion vector range (AMVR) mode; and updating the MV by performing a decoder side motion vector refinement (DMVR) process on the coding block, wherein updating the MV by performing the DMVR process on the coding block comprises:

generating a template based on prediction blocks within one or more reference pictures associated with the MV; and determining, based on the template, matching costs of a plurality of search points within the one or more reference pictures.

15. The computer readable medium of claim 14, wherein the first coding mode is the SMVD mode, and updating the MV comprises:

in response to a first initial MV in a first list of pictures and a second initial MV in a second list of pictures being generated in the SMVD mode and the first initial MV being signaled in a bitstream, searching for a plurality of search points in a plurality of neighboring coding blocks of the second initial MV, and updating the second initial MV with a MV candidate associated with a search point among the plurality of search points.

16. The computer readable medium of claim 14, wherein the first coding mode is the MMVD, and updating the MV comprises:

in response to the MV being generated in the MMVD, dividing a reference picture comprising a plurality of MVD points into a plurality of regions, wherein each region contains one MVD point, and searching for a plurality of search points within a first region among the plurality of regions, the first region corresponding to a MVD point that is signaled in a bitstream.

17. The computer readable medium of claim 14, wherein the first coding mode is the SbTMVP mode, and updating the MV comprises:

in response to a motion shift comprised in the MV being generated in the SbTMVP mode to indicate a position of a collocated picture, generating a plurality of templates based on a plurality of neighboring samples of the coding block and a plurality of neighboring samples of a reference block, and searching for a plurality of MV candidates within a range of the motion shift for updating the motion shift.

18. The computer readable medium of claim 14, wherein the first coding mode is the affine mode, and updating the MV comprises:

in response to the MV being generated in the affine mode, splitting the coding block into a plurality of subblocks, and performing the DMVR process on the plurality of subblocks to generate a subblock MV for each of the plurality of subblocks for updating the MV based on each subblock MV.

19. The computer readable medium of claim 14, wherein the first coding mode is the AMVR mode, and updating the MV comprises:

in response to the MV being generate in the AMVR mode, searching for, based on the MV having a first resolution, a plurality of MV candidates in a second resolution, wherein the second resolution is finer than the first resolution for updating the MV.

* * * * *